US010080174B2

(12) United States Patent
Tsuda et al.

(10) Patent No.: US 10,080,174 B2
(45) Date of Patent: Sep. 18, 2018

(54) COMMUNICATION CONTROL DEVICE AND COMMUNICATION CONTROL METHOD

(71) Applicant: SONY CORPORATION, Tokyo (JP)

(72) Inventors: Shinichiro Tsuda, Kanagawa (JP); Ryota Kimura, Tokyo (JP); Sho Furuichi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 56 days.

(21) Appl. No.: 15/100,158

(22) PCT Filed: Nov. 14, 2014

(86) PCT No.: PCT/JP2014/005727
§ 371 (c)(1),
(2) Date: May 27, 2016

(87) PCT Pub. No.: WO2015/083328
PCT Pub. Date: Jun. 11, 2015

(65) Prior Publication Data
US 2017/0026889 A1 Jan. 26, 2017

(30) Foreign Application Priority Data

Dec. 4, 2013 (JP) .................................. 2013-251197
Apr. 21, 2014 (JP) .................................. 2014-087041

(51) Int. Cl.
*H04W 4/00* (2018.01)
*H04L 1/00* (2006.01)
(Continued)

(52) U.S. Cl.
CPC ........... *H04W 36/26* (2013.01); *H04W 24/08* (2013.01); *H04W 36/165* (2013.01);
(Continued)

(58) Field of Classification Search
CPC . H04W 36/26; H04W 52/0225; H04W 24/08; H04W 72/0453; H04W 36/165;
(Continued)

(56) References Cited

U.S. PATENT DOCUMENTS

2011/0116476 A1* 5/2011 Lee ..................... H04W 52/241
370/331
2012/0051260 A1 3/2012 Tamaki et al.
(Continued)

FOREIGN PATENT DOCUMENTS

| EP | 2 536 221 A1 | 12/2012 |
| JP | 2011-49859 A | 3/2011 |

(Continued)

OTHER PUBLICATIONS

International Search Report dated Jan. 27, 2015, in PCT/JP2014/005727 filed Nov. 14, 2014.
(Continued)

*Primary Examiner* — Kiet Tang
(74) *Attorney, Agent, or Firm* — Oblon, McClelland, Maier & Neustadt, L.L.P.

(57) ABSTRACT

There is provided a communication control device including an acquisition unit configured to acquire a result of measurement by a terminal device, and a control unit configured to control switching of an operation mode of a base station of a small cell overlapping with a macro cell partially or wholly based on the result of the measurement. The switching is switching of the operation mode from one of a first mode and a second mode to the other. The first mode is a mode in which the base station can perform wireless communication with a device in the small cell, and the second mode is a mode that consumes less power than the first mode.

24 Claims, 23 Drawing Sheets

(51) Int. Cl.
*H04W 36/26* (2009.01)
*H04W 52/02* (2009.01)
*H04W 36/16* (2009.01)
*H04W 24/08* (2009.01)
*H04W 72/04* (2009.01)
*H04W 76/28* (2018.01)
*H04W 36/04* (2009.01)
*H04W 76/04* (2009.01)
*H04W 84/04* (2009.01)

(52) U.S. Cl.
CPC ... *H04W 52/0206* (2013.01); *H04W 52/0225* (2013.01); *H04W 72/0453* (2013.01); *H04W 36/04* (2013.01); *H04W 76/048* (2013.01); *H04W 76/28* (2018.02); *H04W 84/045* (2013.01); *Y02D 70/00* (2018.01); *Y02D 70/1242* (2018.01); *Y02D 70/1244* (2018.01); *Y02D 70/1262* (2018.01); *Y02D 70/1264* (2018.01)

(58) Field of Classification Search
CPC ........... H04W 52/0206; H04W 84/045; H04W 36/04; H04W 76/048; Y02B 60/50
See application file for complete search history.

(56) References Cited

U.S. PATENT DOCUMENTS

2012/0230217 A1* 9/2012 Sawai .................... H04L 5/001
                                                    370/252
2012/0300686 A1    11/2012 Maeda et al.
2013/0203419 A1     8/2013 Siomina et al.
2014/0357256 A1* 12/2014 Bromell ............... H04W 24/10
                                                    455/422.1

FOREIGN PATENT DOCUMENTS

JP        2011-49890 A      3/2011
JP        2012-54737 A      3/2012
WO    WO 2011/125849 A1   10/2011

OTHER PUBLICATIONS

European Office Action dated Aug. 29, 2017 in Patent Application No. 14 806 459.5.
Office Action dated Nov. 14, 2017 in corresponding Japanese Patent Application No. 2014-087041 (with English Translation), 10 pages.
LG Electronics et al., "WF on ICIC in Small Cell Scenarios", 3GPP TSG-RAN WG1#72bis, R1-131749, Apr. 15, 2013, 2 pages.
CATT, "Discussion on Mechanisms for Small Cell On/Off", 3GPP TSG-RAN WG1#74bis, R1-134104, Oct. 7, 2013, 4 pages.
Japanese Office Action dated Jul. 3, 2018 in Application No. 2014-087041 with English translation, 8 pages.
Catt; Discussion on mechanisms for small cell ON/OFF; Agenda Item: 7.2.6.2.1, 3GPP TSG RAN WG1 Meeting #74bis; Guangzhou, China Oct. 7-11, 2013; R1-134104, 5 pages.
WF on ICIC in small cell scenarios; LG Electronics, Huawei, HiSilicon, NTT DOCOMO, Panasonic, Samsung; 3GPP TSG RAN WG1 Meeting #72 bis, Chicago, USA Apr. 15-19; https://soprano-web.soprano.sony.co.jp/ano/wrap/mNT2YCjZA6wbSmmRxNtW/201; Jul. 5, 2018; 3 pages.

* cited by examiner

[Fig. 1]
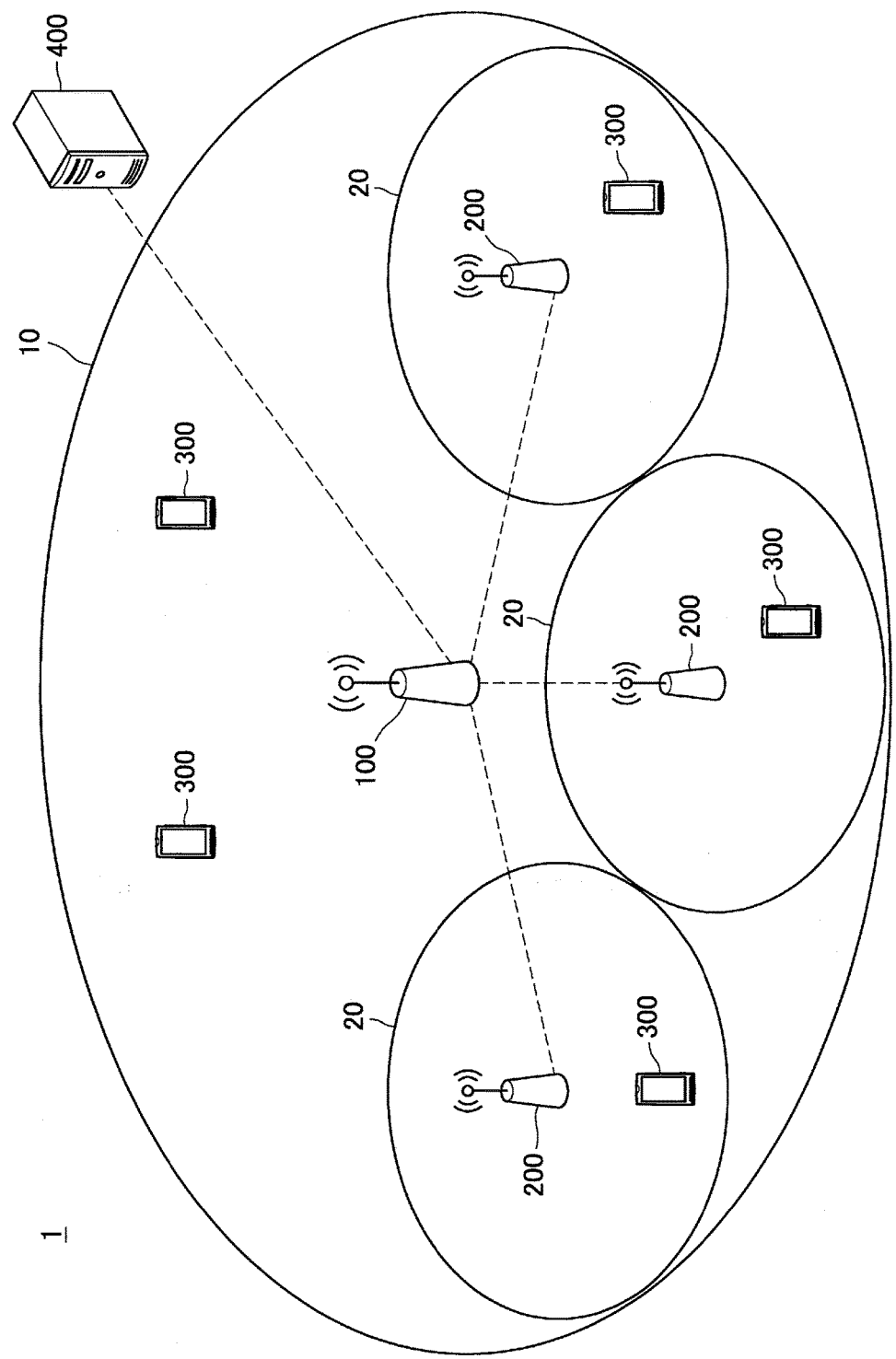

[Fig. 2]
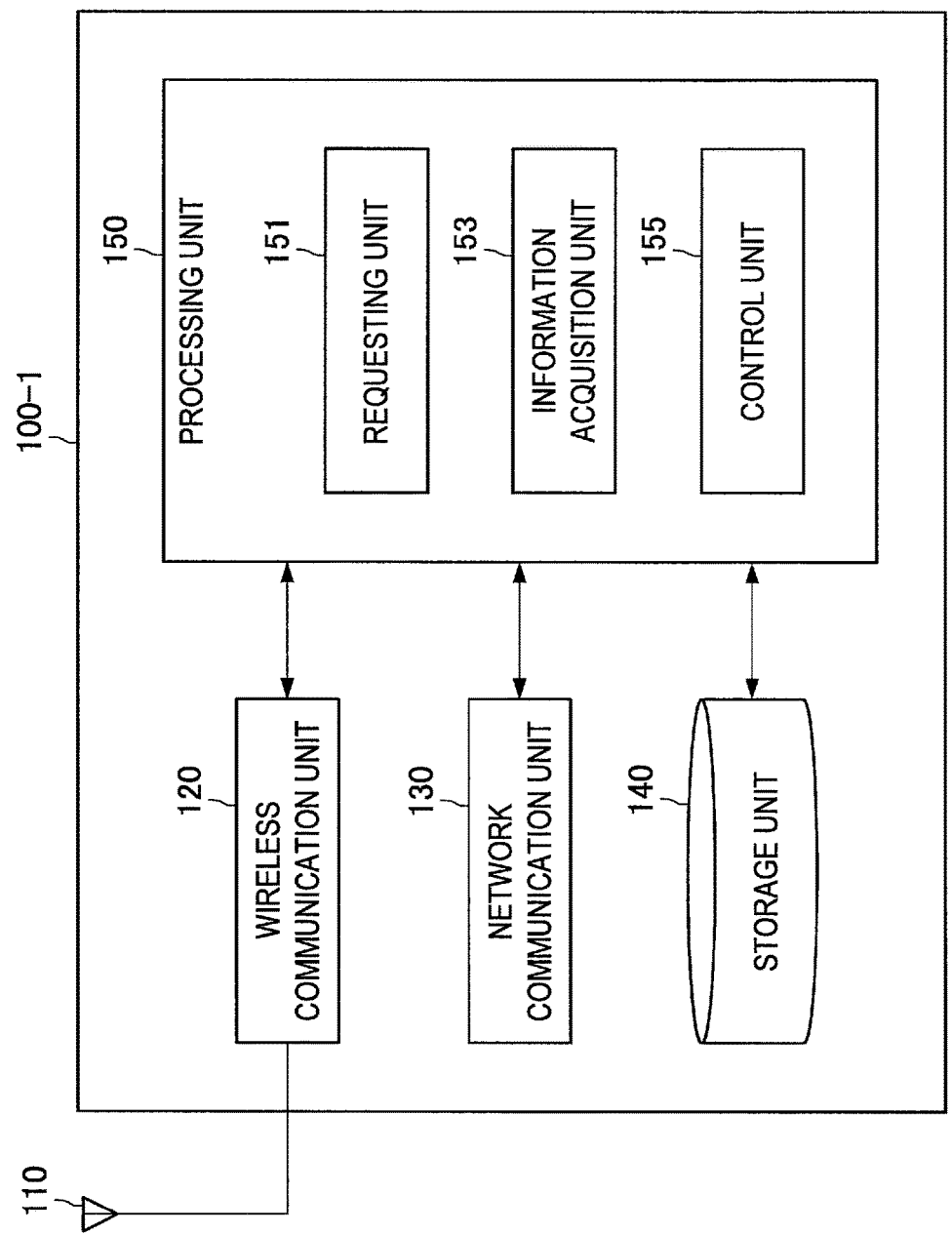

[Fig. 3]
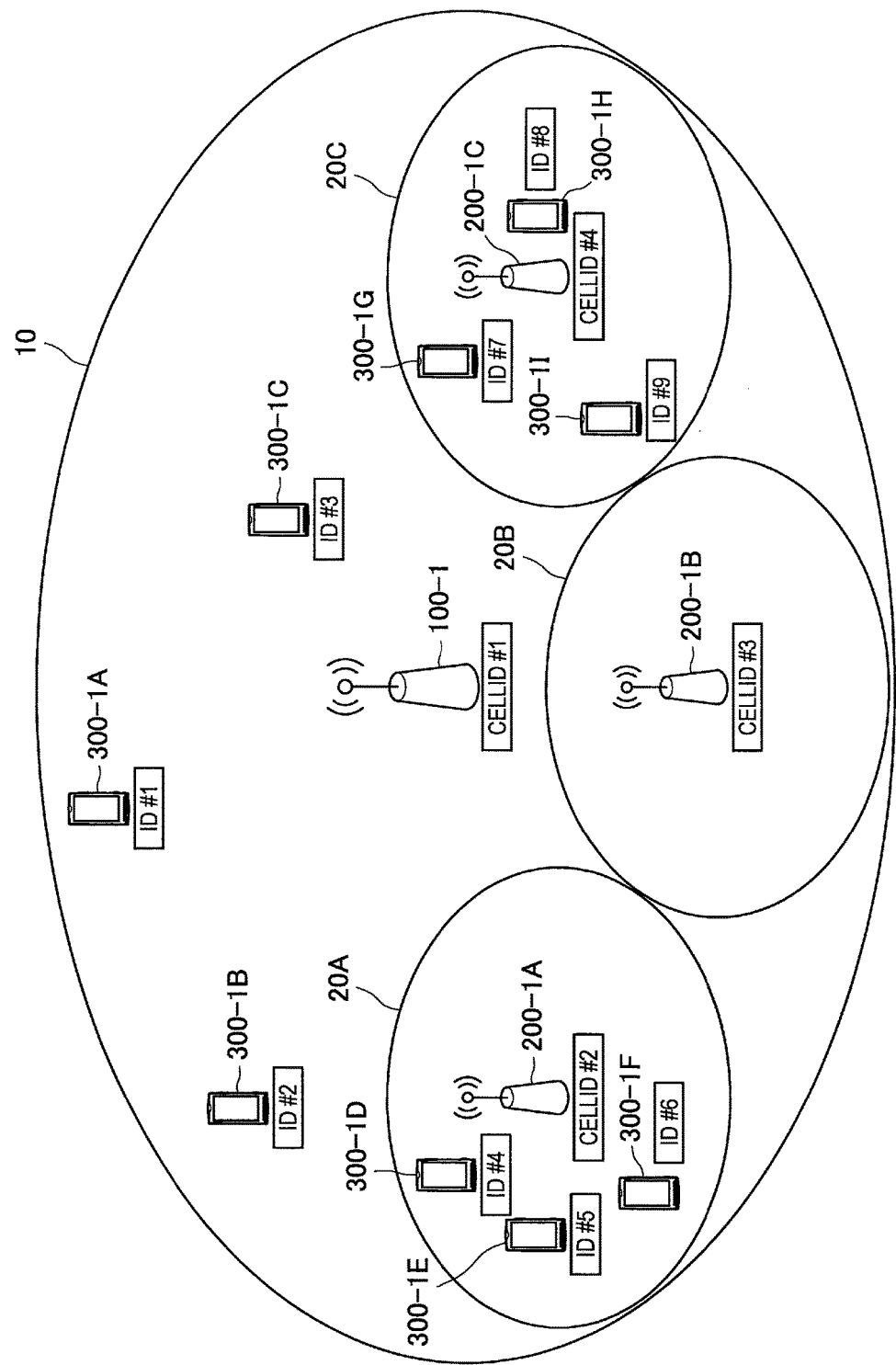

[Fig. 4]

| TERMINAL ID | CELL ID | | | |
| --- | --- | --- | --- | --- |
| | #1 | #2 | #3 | #4 |
| #1 | RSRP_10 | RSRP_00 | RSRP_00 | RSRP_00 |
| #2 | RSRP_30 | RSRP_00 | RSRP_00 | RSRP_00 |
| #3 | RSRP_65 | RSRP_00 | RSRP_00 | RSRP_00 |
| #4 | RSRP_45 | RSRP_60 | RSRP_00 | RSRP_00 |
| #5 | RSRP_30 | RSRP_70 | RSRP_00 | RSRP_00 |
| #6 | RSRP_10 | RSRP_60 | RSRP_00 | RSRP_00 |
| #7 | RSRP_45 | RSRP_00 | RSRP_00 | RSRP_60 |
| #8 | RSRP_30 | RSRP_00 | RSRP_00 | RSRP_75 |
| #9 | RSRP_45 | RSRP_00 | RSRP_20 | RSRP_55 |

[Fig. 5]
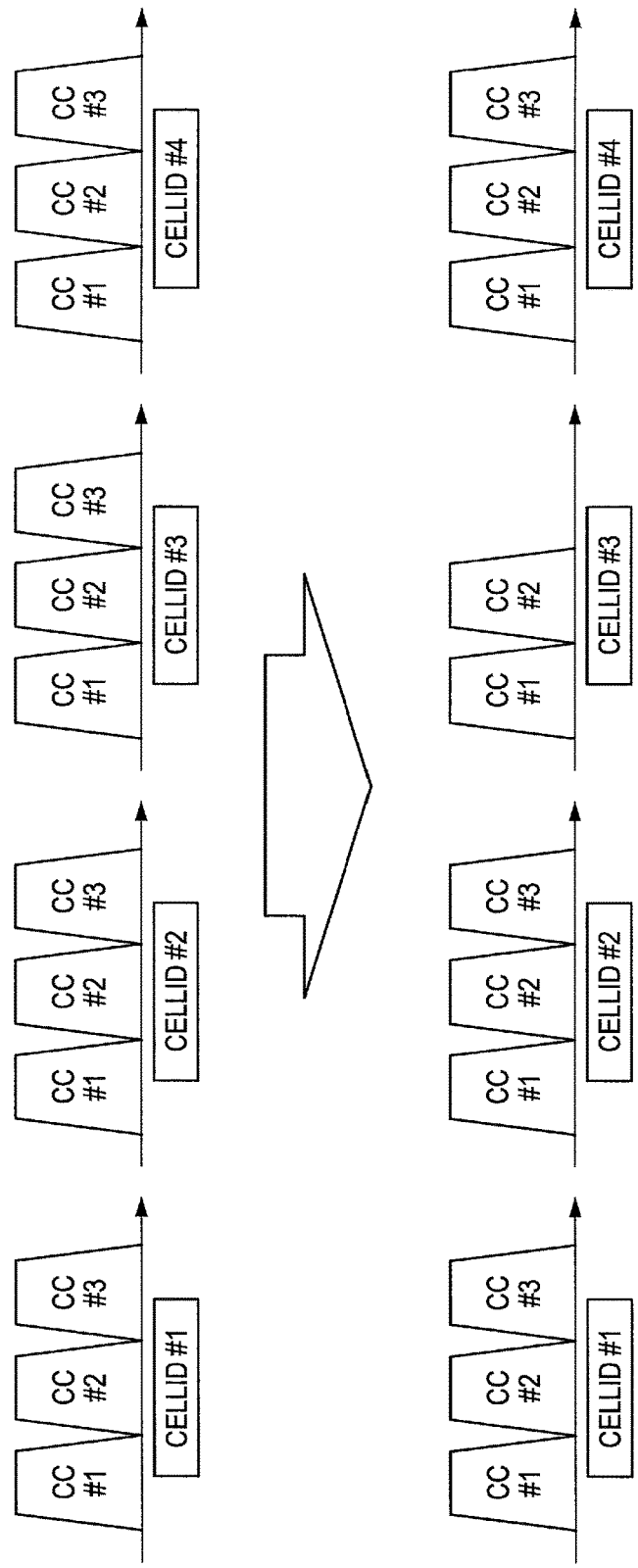

[Fig. 6]
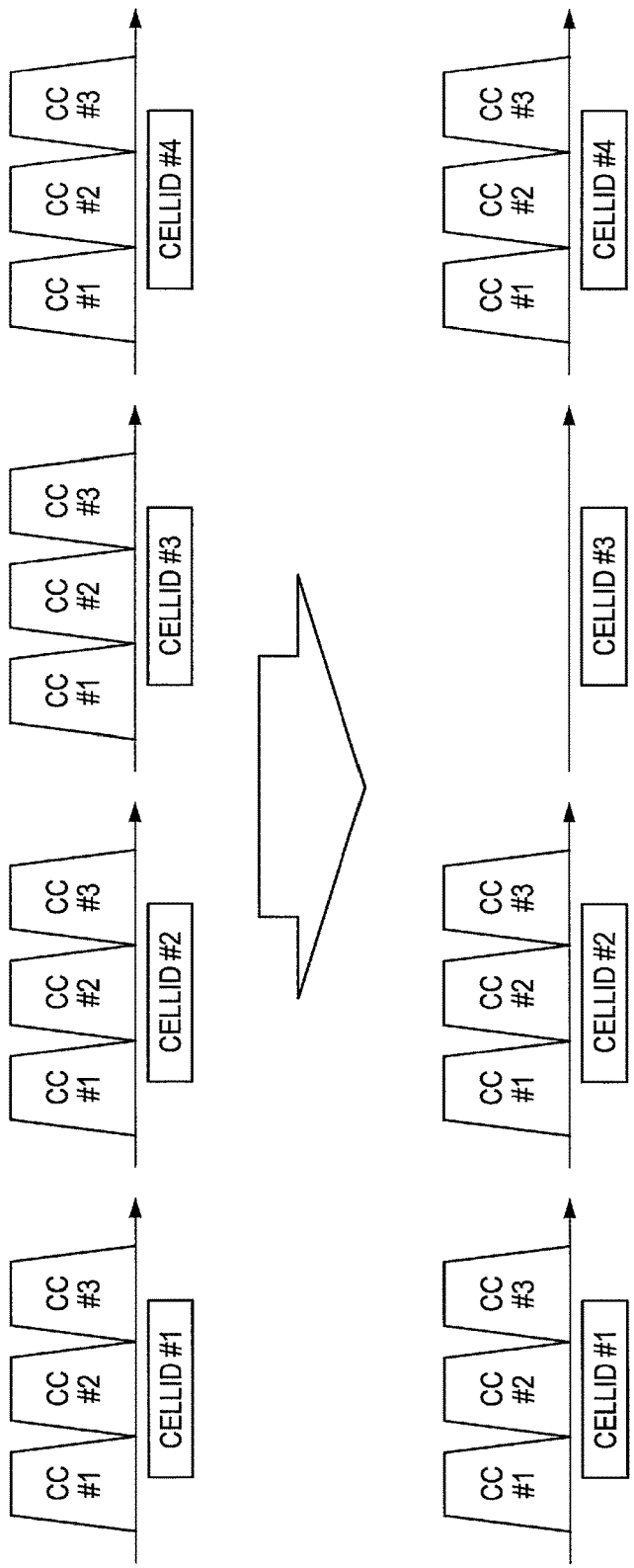

[Fig. 7]
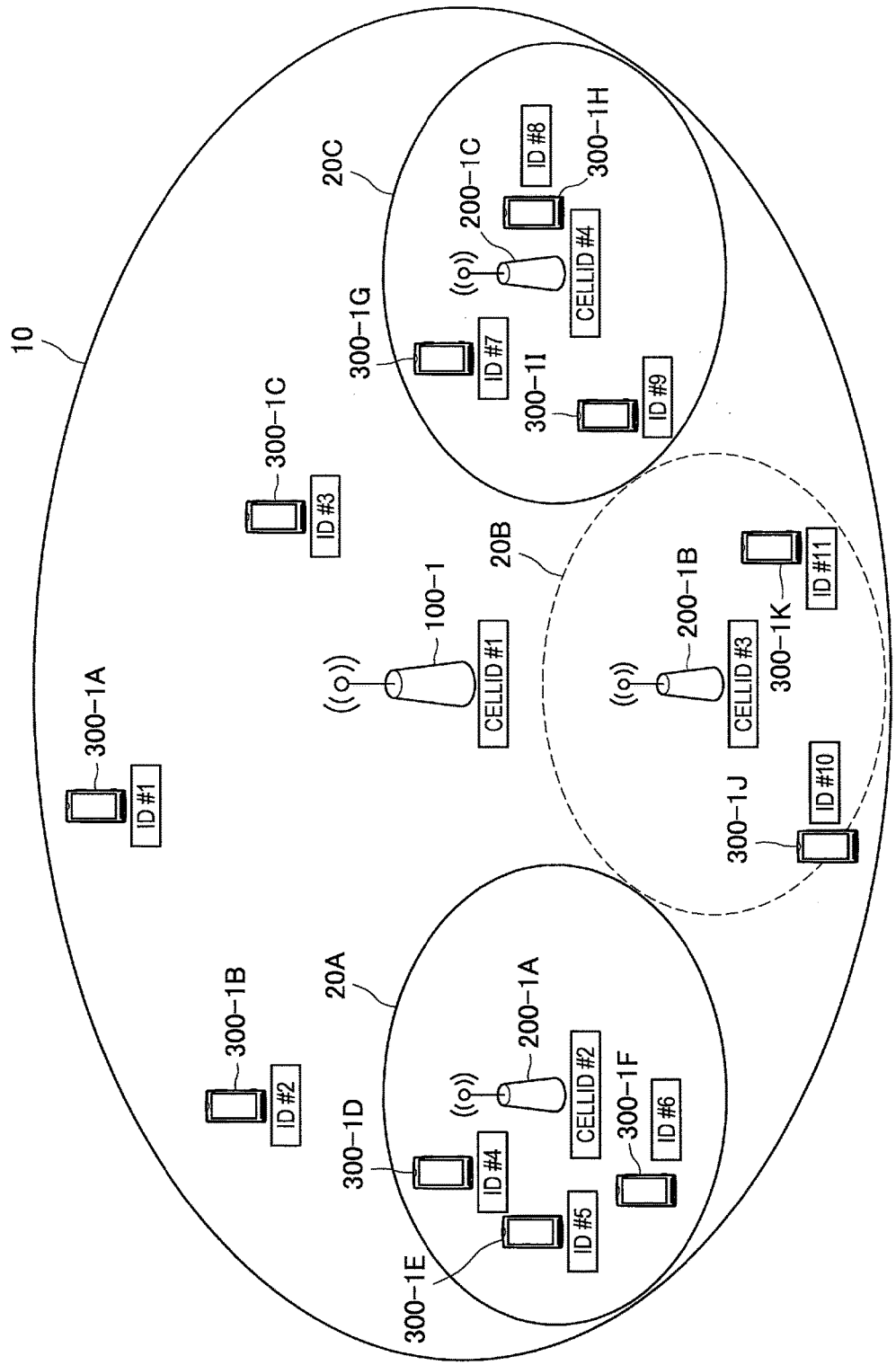

[Fig. 8]

| TERMINAL ID | CELL ID | | | |
| --- | --- | --- | --- | --- |
| | #1 | #2 | #3 | #4 |
| #1 | RSRP_10 | RSRP_00 | — | RSRP_00 |
| #2 | RSRP_30 | RSRP_00 | — | RSRP_00 |
| #3 | RSRP_65 | RSRP_00 | — | RSRP_00 |
| #4 | RSRP_45 | RSRP_60 | — | RSRP_00 |
| #5 | RSRP_30 | RSRP_70 | — | RSRP_00 |
| #6 | RSRP_10 | RSRP_60 | — | RSRP_00 |
| #7 | RSRP_45 | RSRP_00 | — | RSRP_60 |
| #8 | RSRP_30 | RSRP_00 | — | RSRP_75 |
| #9 | RSRP_45 | RSRP_00 | — | RSRP_55 |
| #10 | RSRP_10 | RSRP_30 | — | RSRP_00 |
| #11 | RSRP_20 | RSRP_00 | — | RSRP_35 |

[Fig. 9]
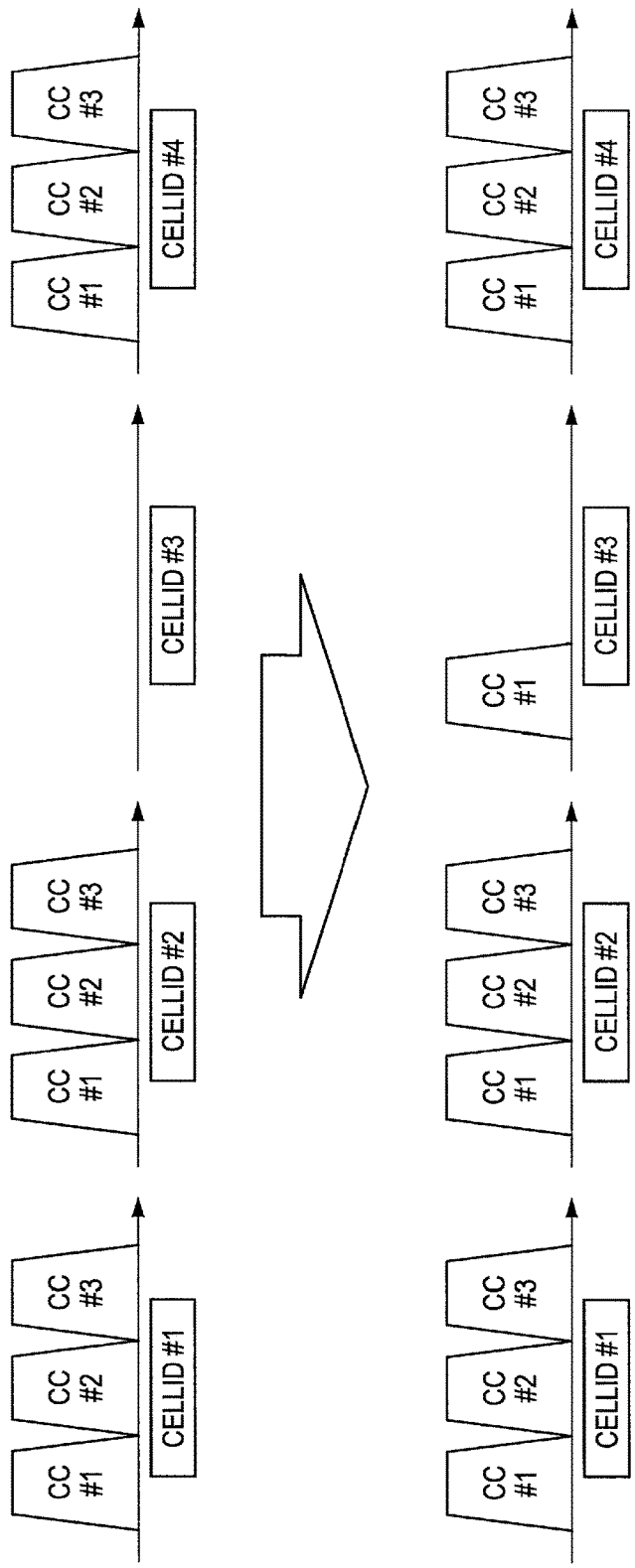

[Fig. 10]
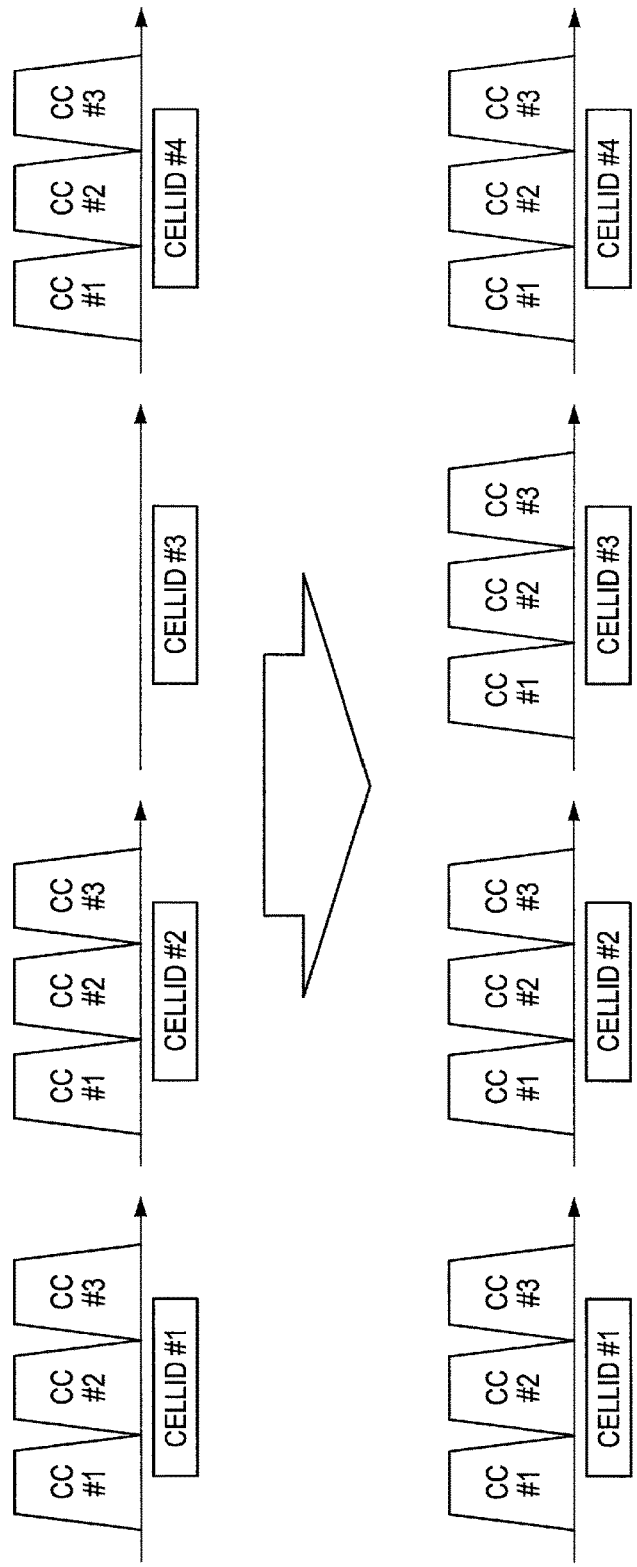

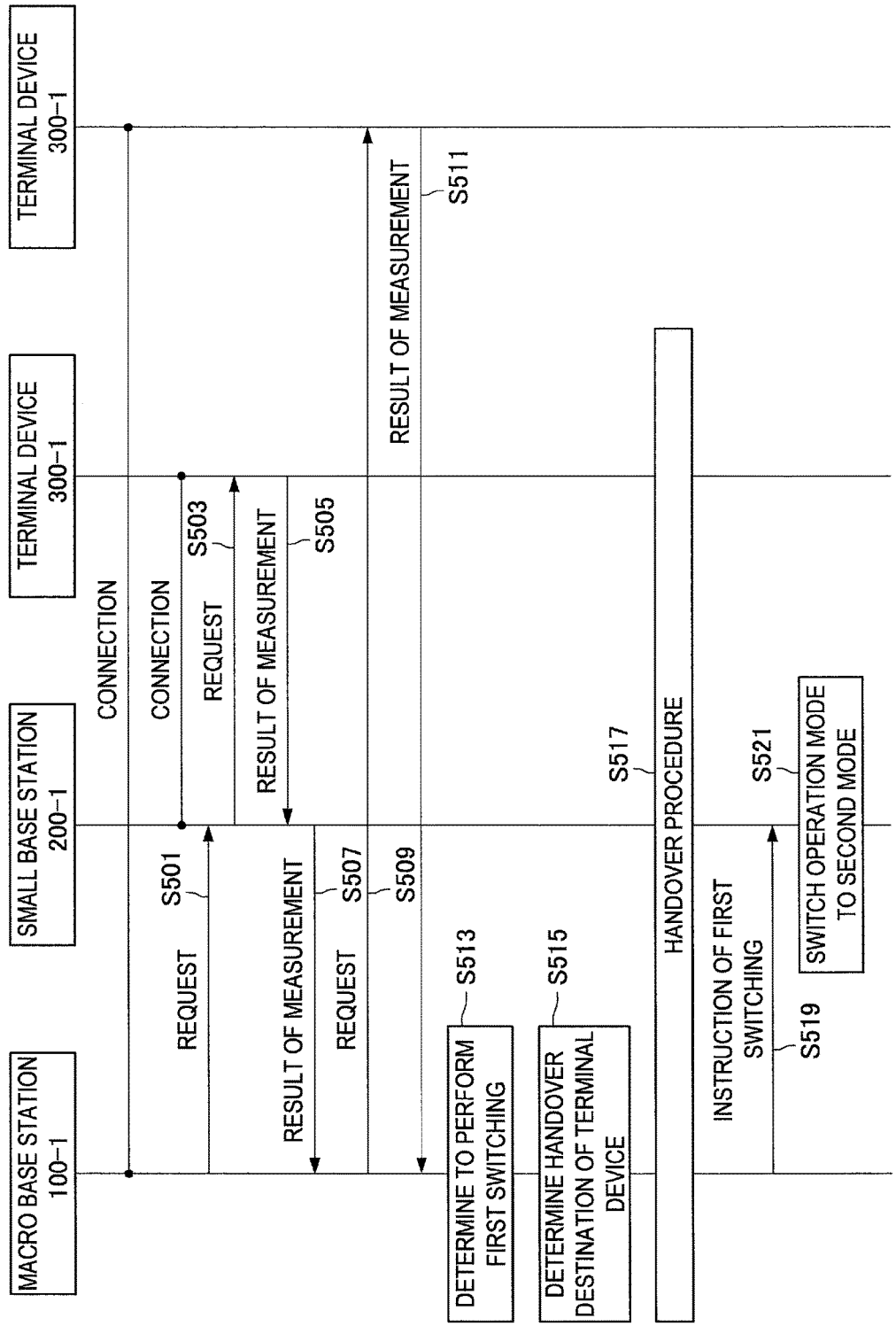
[Fig. 11]

[Fig. 12]
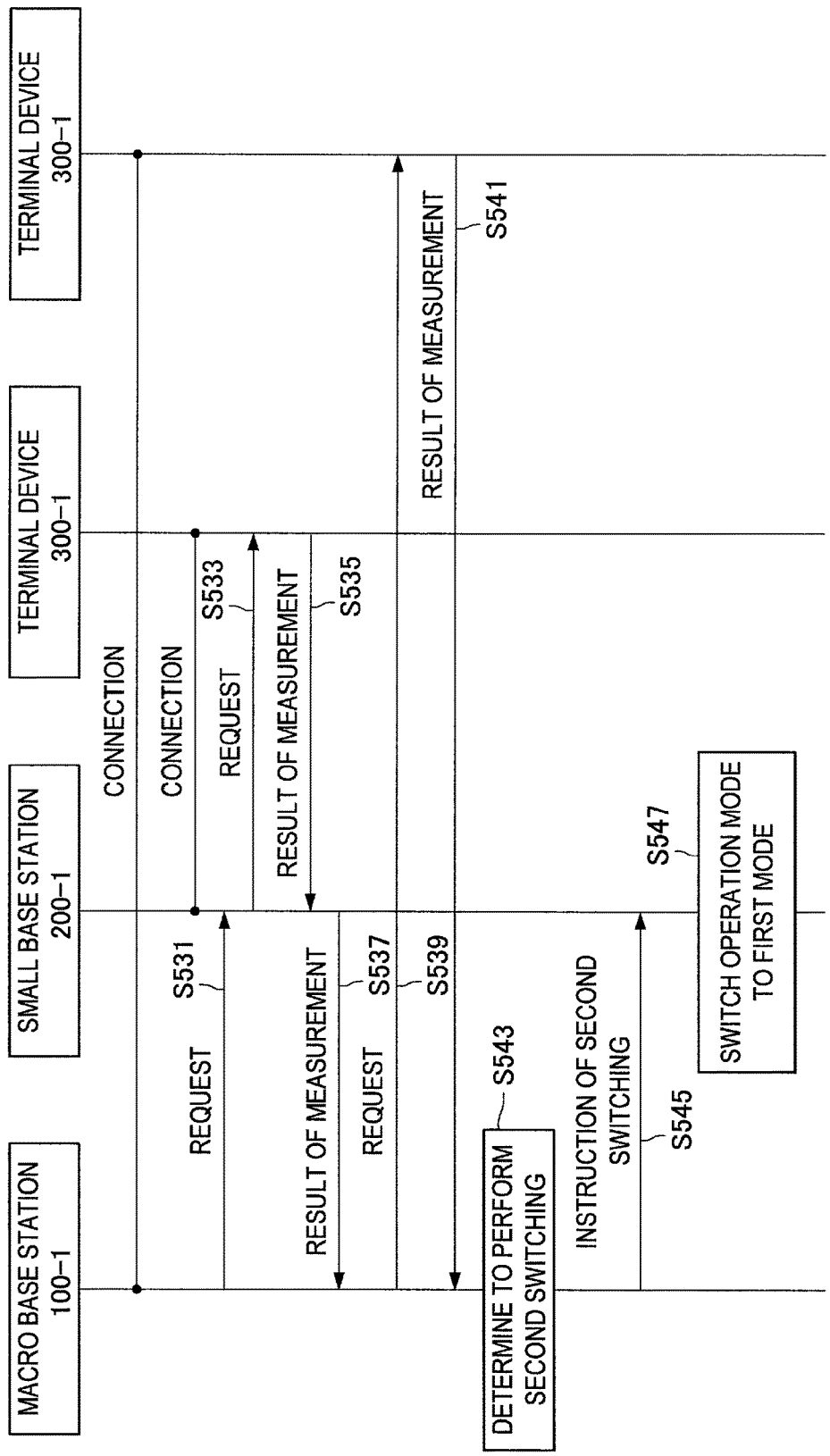

[Fig. 13]
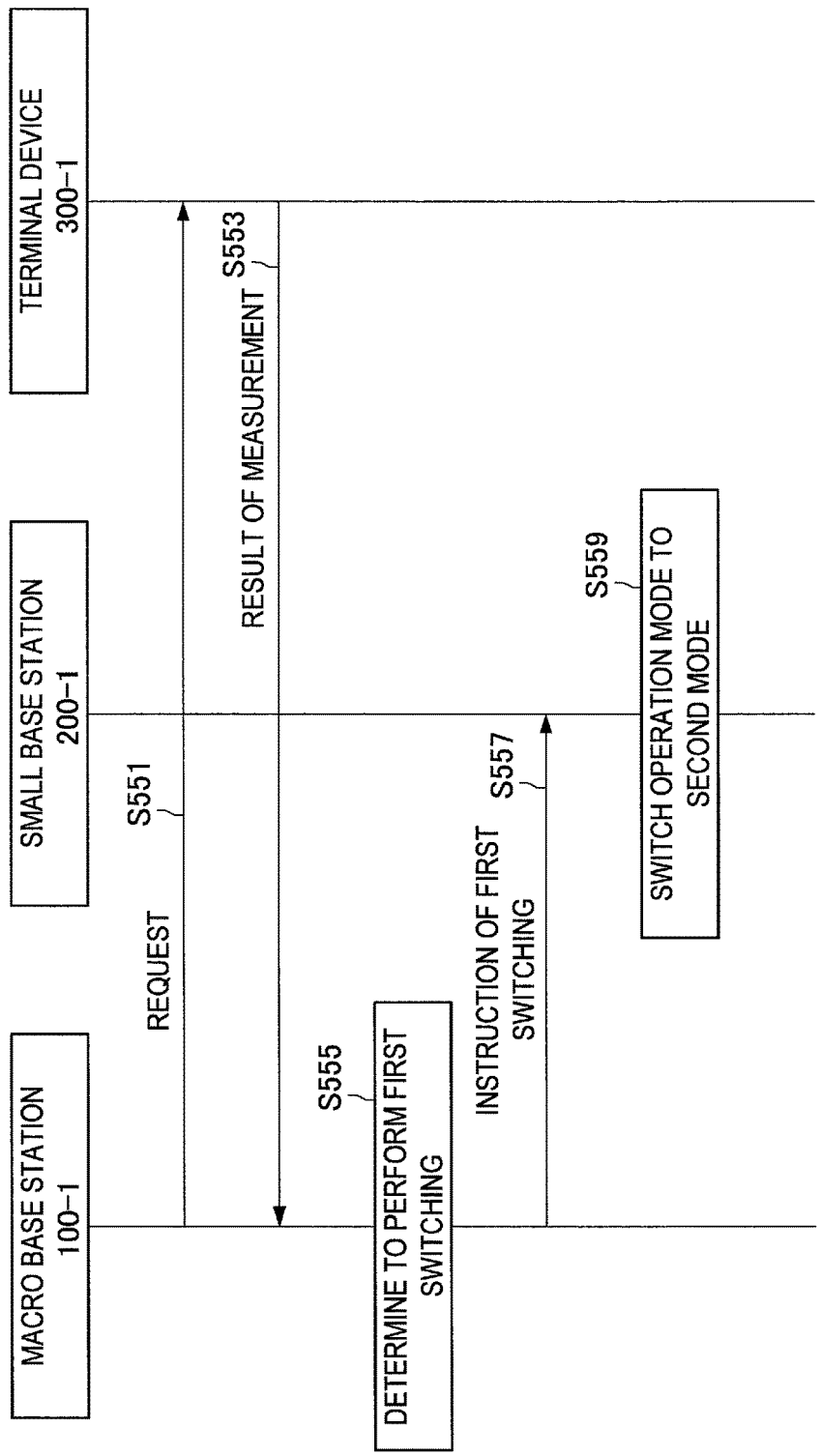

[Fig. 14]
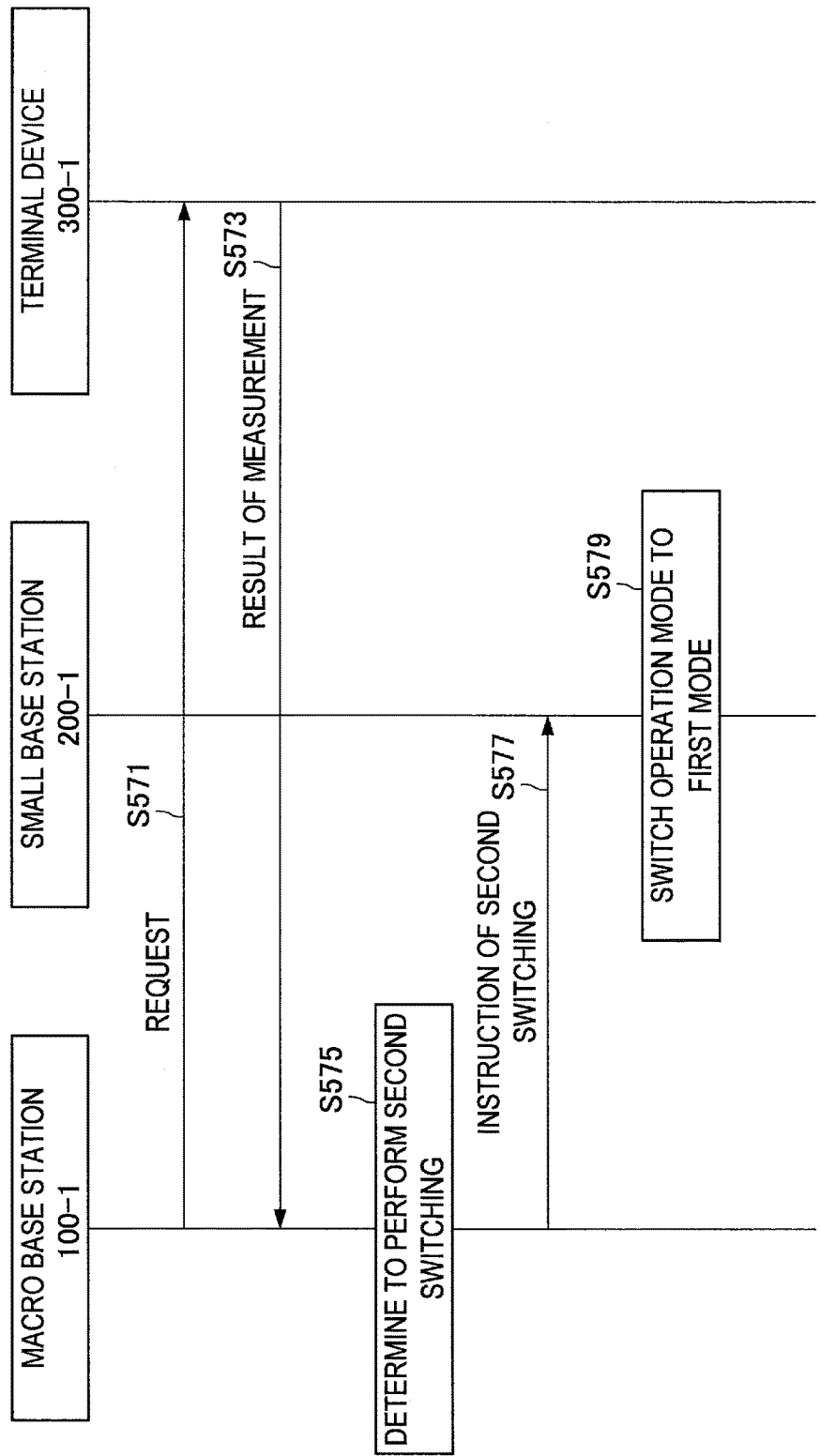

[Fig. 15]
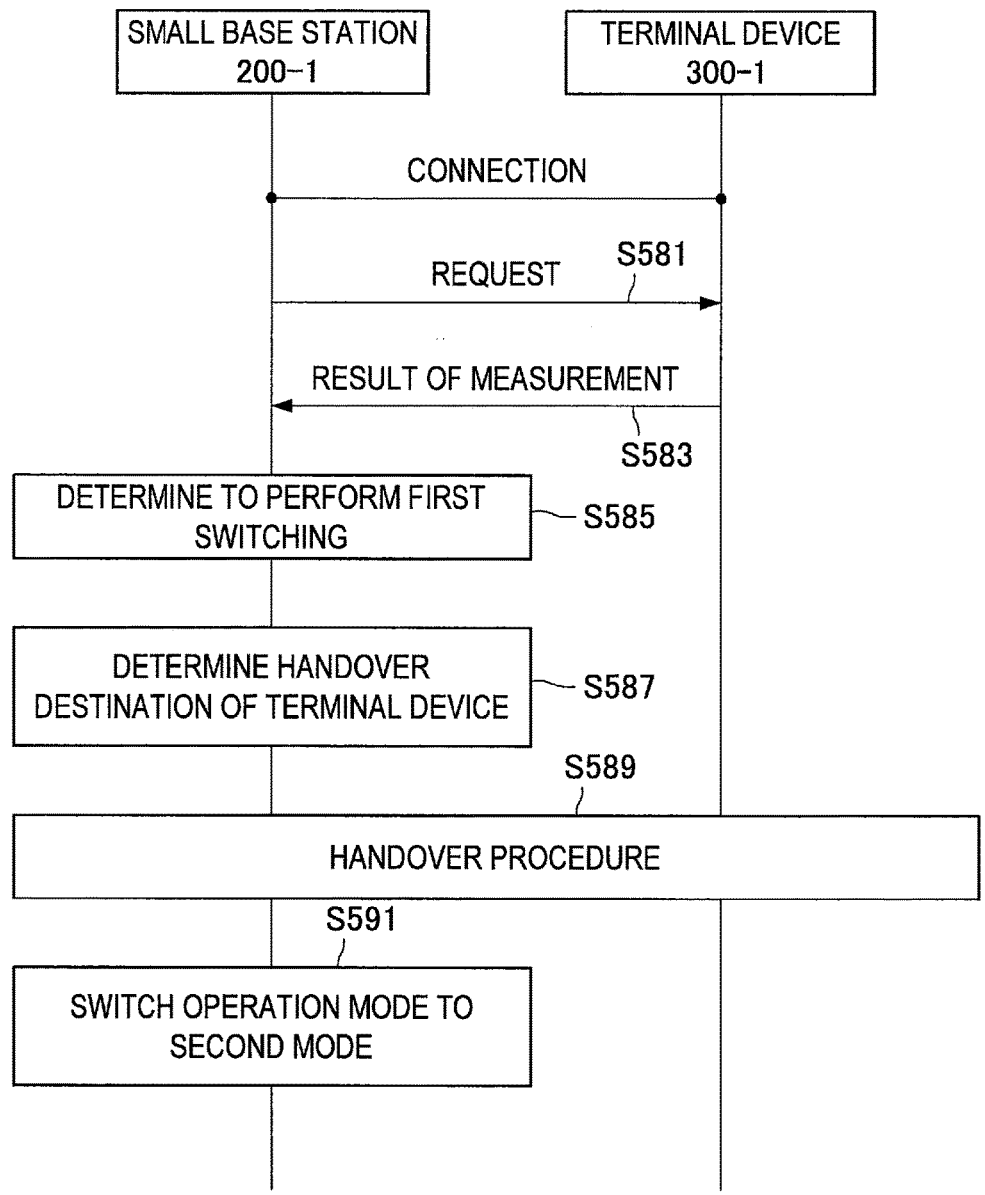

[Fig. 16]
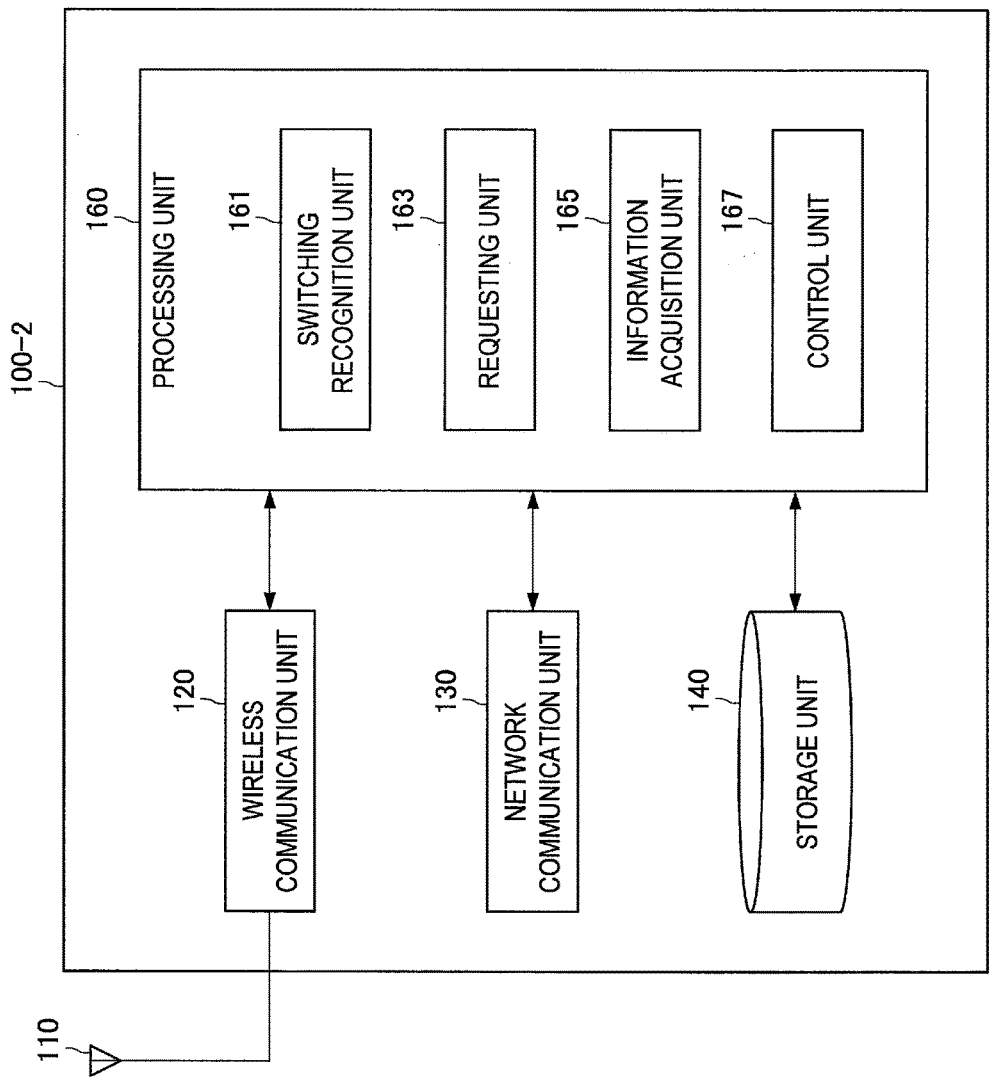

[Fig. 17]
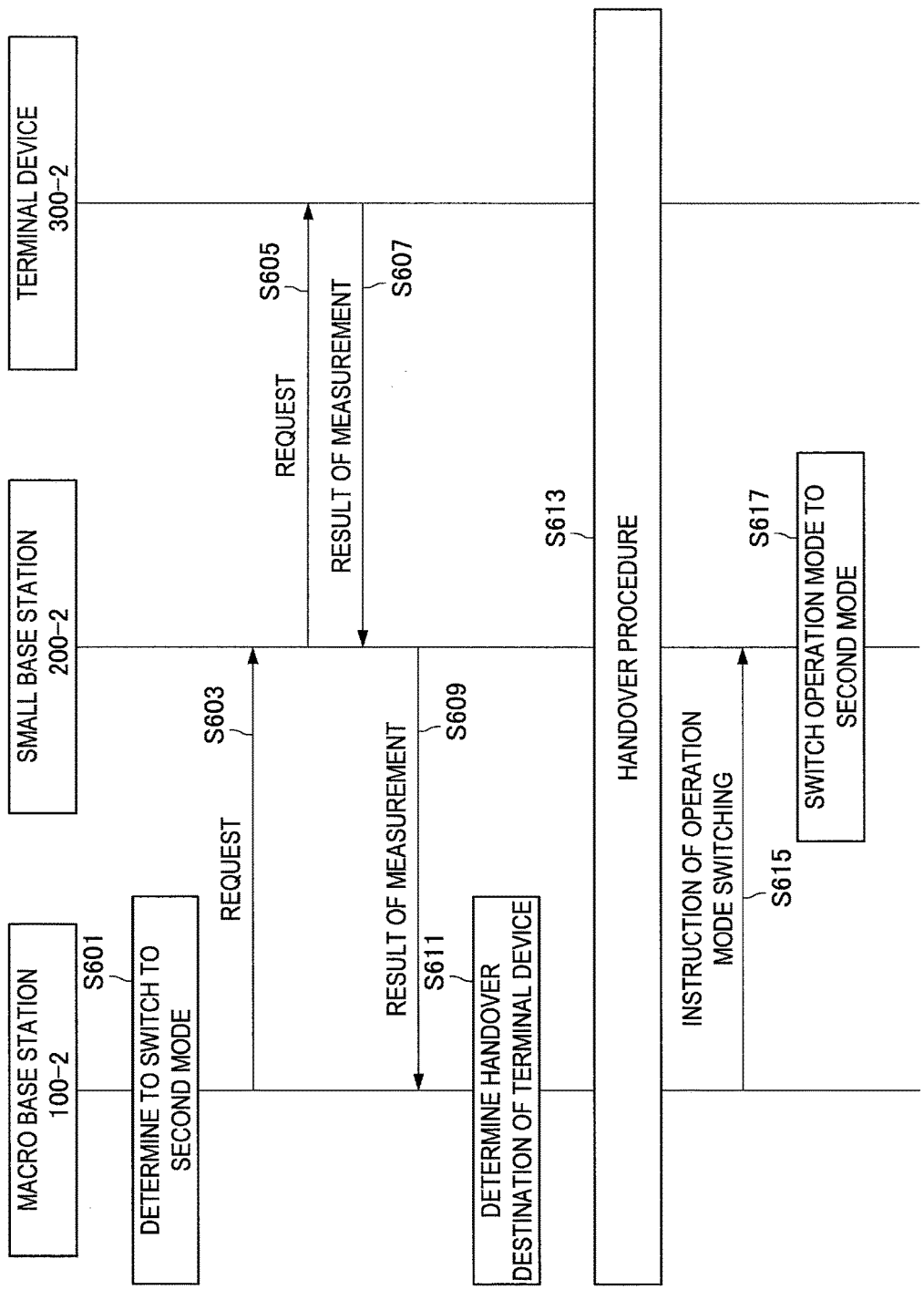

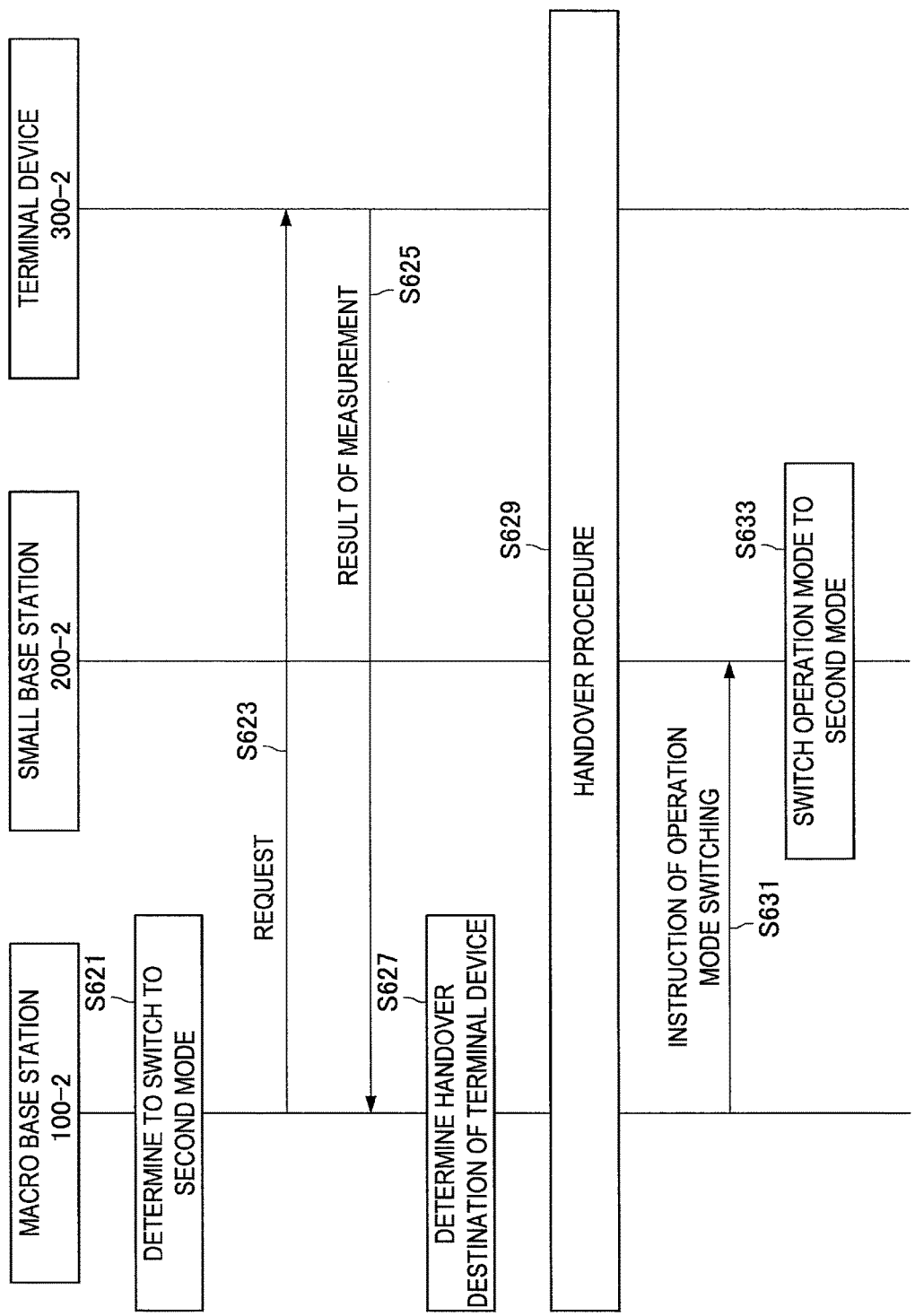
[Fig. 18]

[Fig. 19]
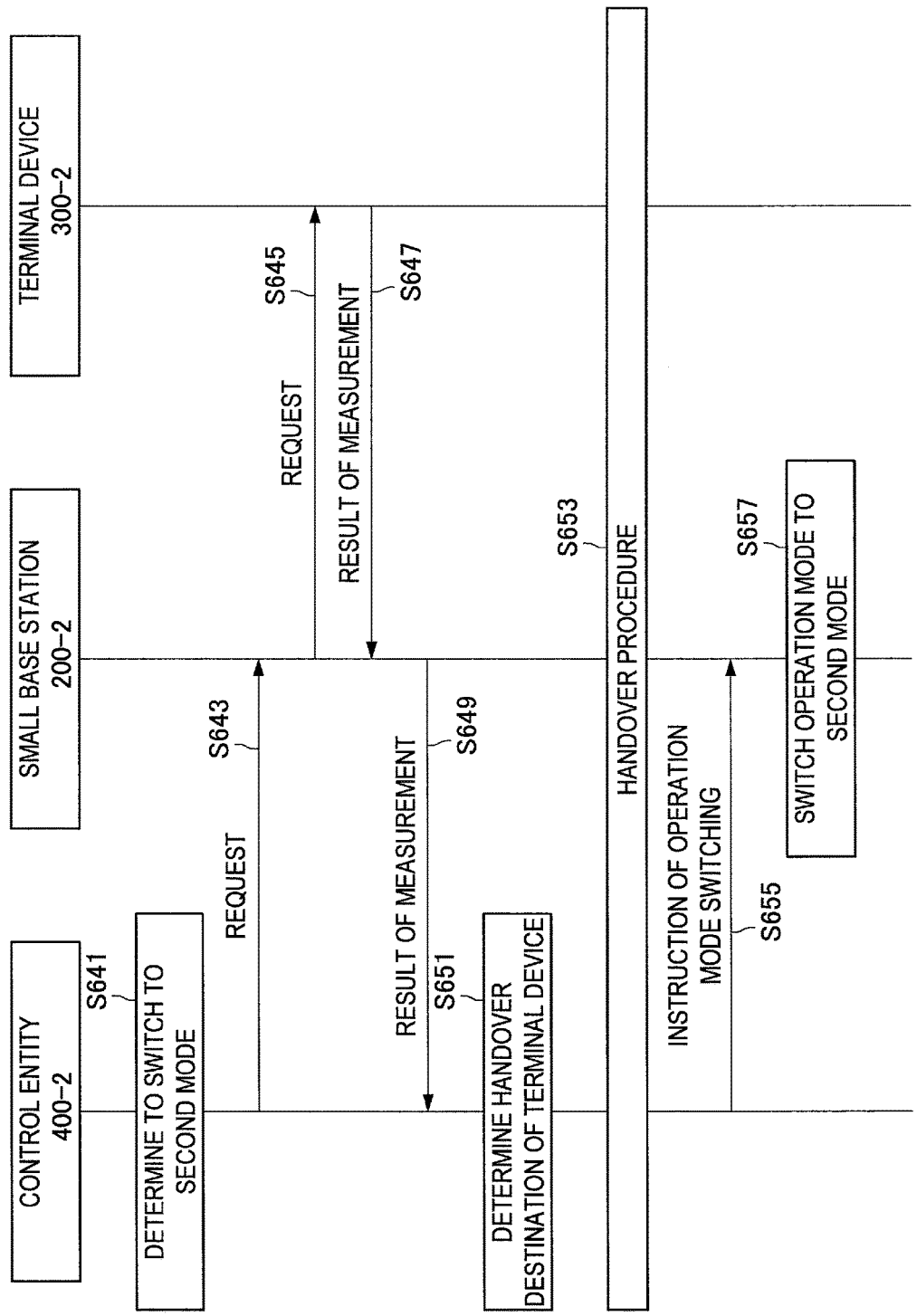

[Fig. 20]
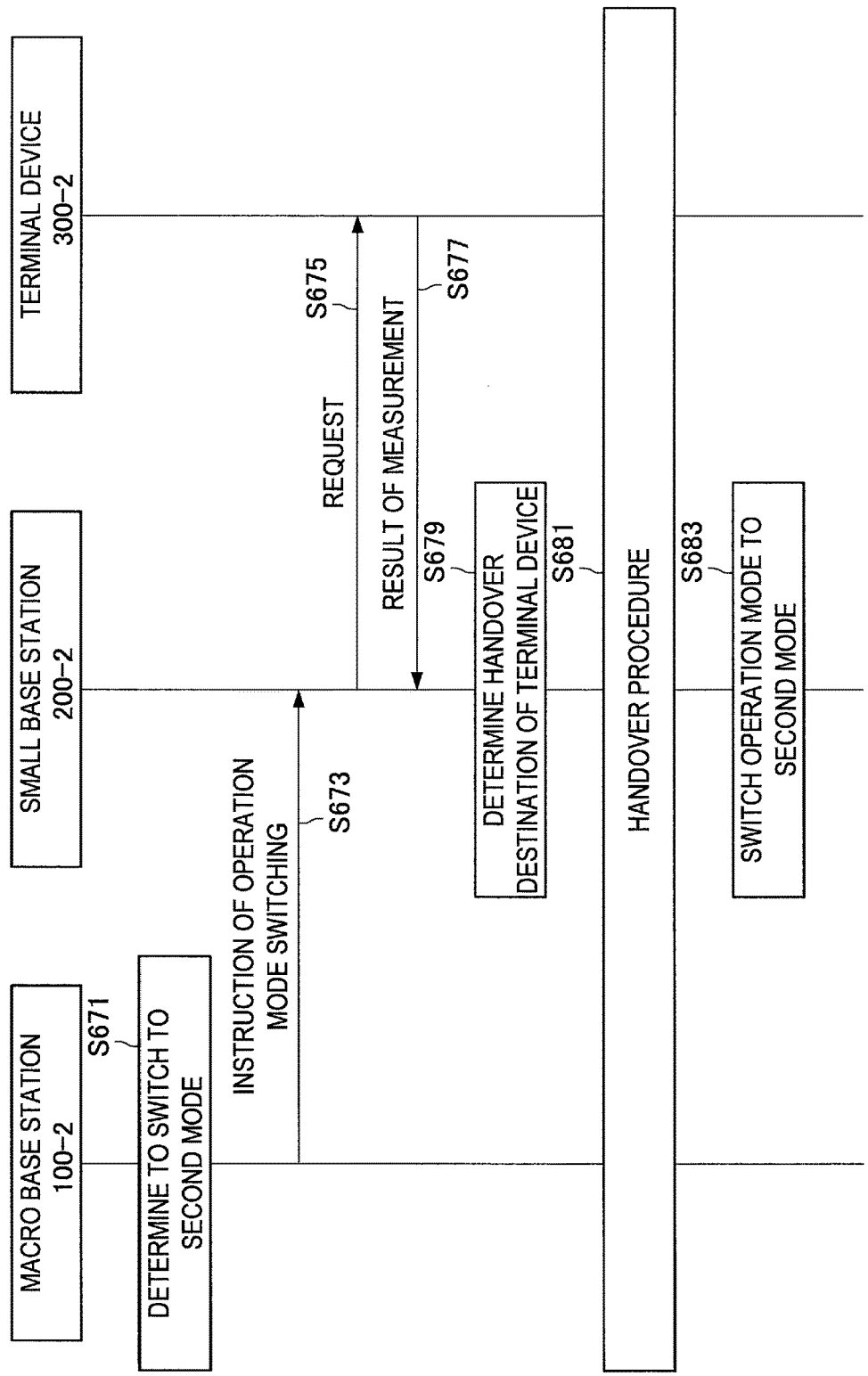

[Fig. 21]
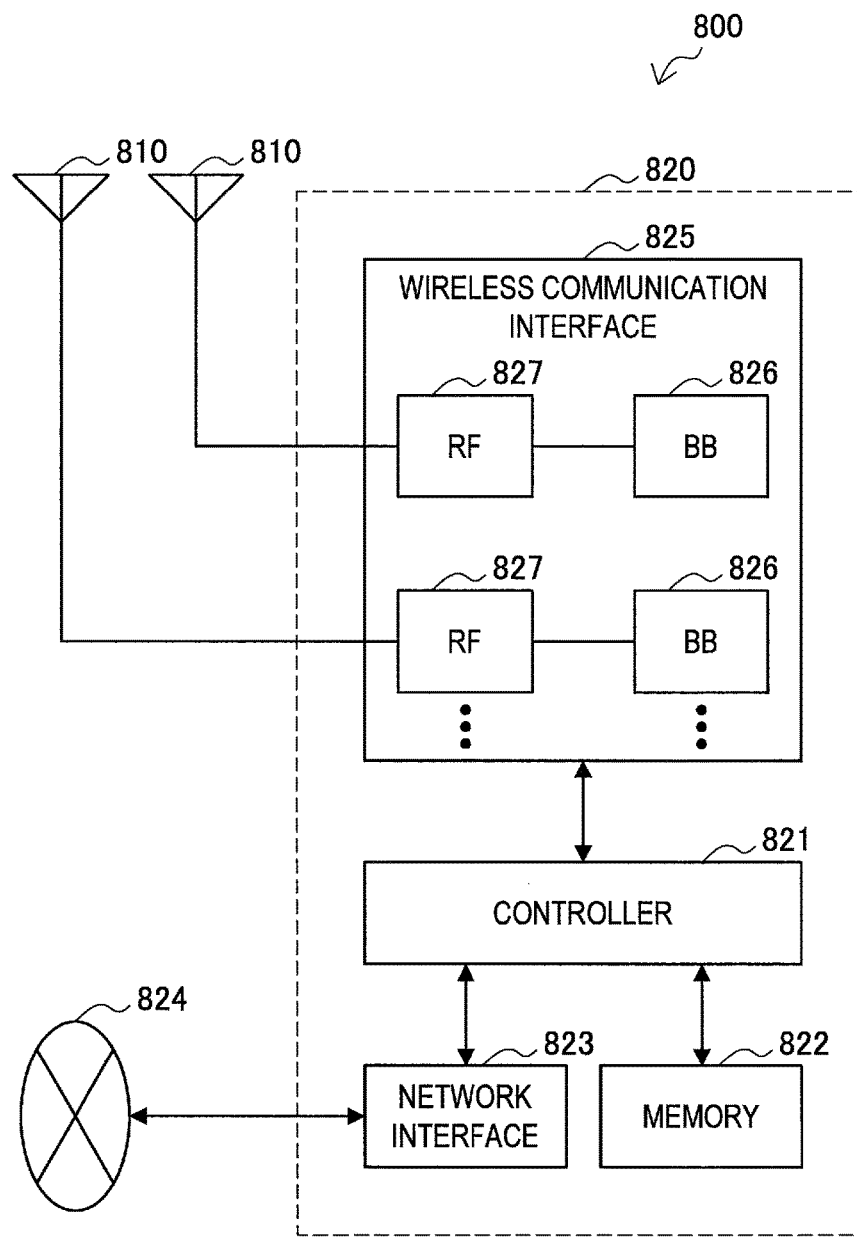

[Fig. 22]
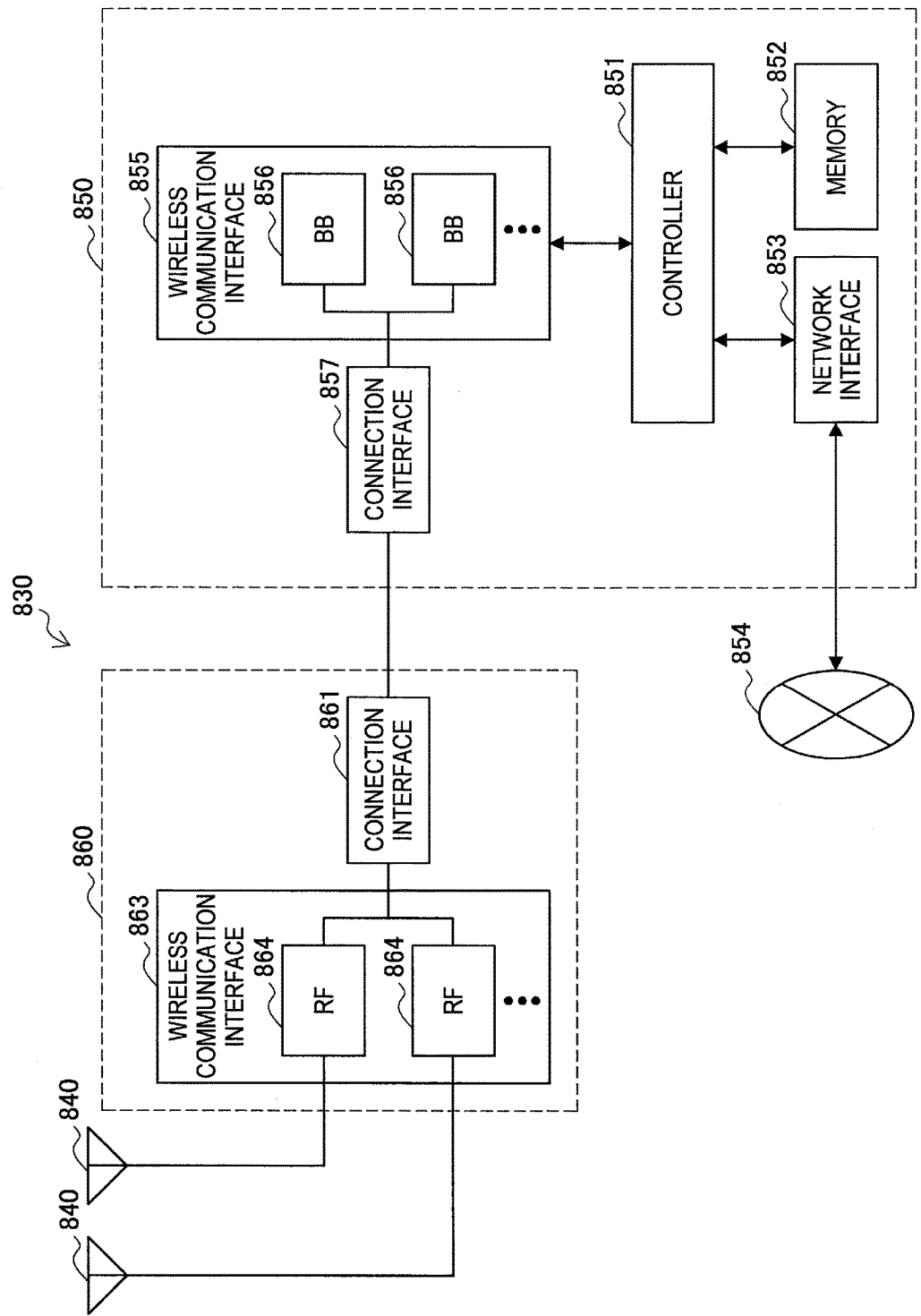

[Fig. 23]
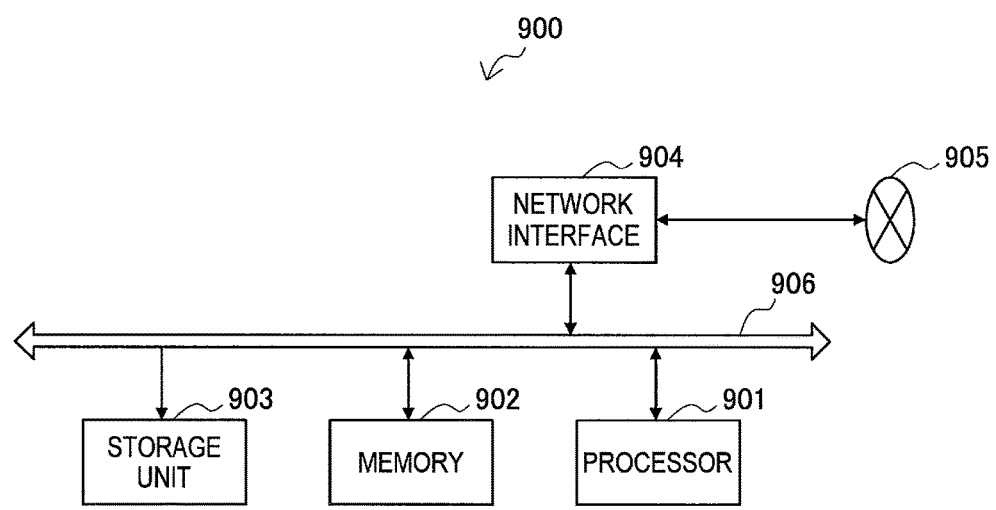

COMMUNICATION CONTROL DEVICE AND COMMUNICATION CONTROL METHOD

CROSS REFERENCE TO RELATED APPLICATIONS

This application claims the benefit of Japanese Priority Patent Application JP 2013-251197 filed Dec. 4, 2013, and Japanese Priority Patent Application JP 2014-087041 filed Apr. 21, 2014, the entire contents of each of which are incorporated herein by reference.

TECHNICAL FIELD

The present disclosure relates to a communication control device and a communication control method.

BACKGROUND ART

In 2002, the mobile phone service of the 3G system called the third generation in Japan started. Initially, small-size packets were transmitted and received for transmission of voice calls and mails. However, with the introduction of high speed downlink packet access (HSDPA), it became possible to transmit and receive larger-size packets for downloading of music files or streaming of video. With such an increase of packet capacities, the service of long term evolution (LTE) in which orthogonal frequency division multiple access (OFDMA) is used for downlink also started for the expansion on the side of the wireless network. In addition, the start of the 4G service is planned for around 2015. Accordingly, up to 1 Gbps (bit per second) is realized in a semi-fixed state and also up to 100 Mbps is realized even in a moving environment.

With an increase in traffic as described above, it is expected to avoid concentration of traffic by arranging small base stations that are inexpensive and whose installation is easy. With the arrangement of such small base stations, on the other hand, there are concerns about increased power consumption. Thus, various technologies have been proposed to curb power consumption of small base stations.

For example, PTL 1 and PTL 2 disclose a technology that causes a femtocell base station to stop reception of a radio wave when it is determined that no radio communication terminal is present near the femtocell and causes the femtocell base station to start reception of a radio wave when it is determined that a radio communication terminal is present near the femtocell.

CITATION LIST

Patent Literature

PTL 1: JP 2011-049859A
PTL 2: JP 2011-049890A

SUMMARY

Technical Problem

However, according to the technology disclosed in PTL 1 and PTL 2, for example, it is difficult to flexibly operate a small base station (for example, a femtocell base station). As a result, the reduction of power consumption of a small base station may be limited. More specifically, for example, if any terminal is present in a small cell (for example, a femtocell), the small base station is not allowed to stop reception of a radio wave. In addition, for example, even if a terminal can communicate satisfactorily in another cell (for example, a macro cell), the small base station restarts reception of a radio wave when the terminal enters the small cell. As a result, the reduction of power consumption of a small base station may be limited.

Therefore, it is desirable to provide a mechanism capable of flexibly operating a small base station in accordance with conditions.

Solution to Problem

According to the present disclosure, there is provided a communication control device including an acquisition unit configured to acquire a result of measurement by a terminal device, and a control unit configured to control switching of an operation mode of a base station of a small cell overlapping with a macro cell partially or wholly based on the result of the measurement. The switching is switching of the operation mode from one of a first mode and a second mode to the other. The first mode is a mode in which the base station can perform wireless communication with a device in the small cell, and the second mode is a mode that consumes less power than the first mode.

According to the present disclosure, there is provided a communication control method including acquiring a result of measurement by a terminal device, and controlling switching of an operation mode of a base station of a small cell overlapping with a macro cell partially or wholly through a processor based on the result of the measurement. The switching is switching of the operation mode from one of a first mode and a second mode to the other. The first mode is a mode in which the base station can perform wireless communication with a device in the small cell, and the second mode is a mode that consumes less power than the first mode.

According to the present disclosure, there is provided a communication control device including a recognition unit configured to recognize that an operation mode of a base station of a small cell overlapping with a macro cell partially or wholly is switched from a first mode to a second mode in advance, and a requesting unit configured to request reporting or offering of a result of measurement by a terminal device connected to the base station before the operation mode of the base station being switched from the first mode to the second mode. The first mode is a mode in which the base station can perform wireless communication with a device in the small cell, and the second mode is a mode that consumes less power than the first mode.

According to the present disclosure, there is provided a communication control method including recognizing that an operation mode of a base station of a small cell overlapping with a macro cell partially or wholly is switched from a first mode to a second mode in advance, and requesting reporting or offering of a result of measurement by a terminal device connected to the base station through a processor before the operation mode of the base station being switched from the first mode to the second mode. The first mode is a mode in which the base station can perform wireless communication with a device in the small cell, and the second mode is a mode that consumes less power than the first mode.

According to the present disclosure, there is provided a communication control device including an acquisition unit configured to acquire a result of measurement by a terminal device connected to a base station before an operation mode of the base station of a small cell overlapping with a macro cell partially or wholly being switched from a first mode to a second mode, and a control unit configured to determine a handover destination of the terminal device based on the result of the measurement. The first mode is a mode in which the base station can perform wireless communication with a device in the small cell, and the second mode is a mode that consumes less power than the first mode.

According to the present disclosure, there is provided a communication control method including acquiring a result of measurement by a terminal device connected to a base station before an operation mode of the base station of a small cell overlapping with a macro cell partially or wholly being switched from a first mode to a second mode, and determining a handover destination of the terminal device through a processor based on the result of the measurement. The first mode is a mode in which the base station can perform wireless communication with a device in the small cell, and the second mode is a mode that consumes less power than the first mode.

Advantageous Effects of Invention

According to the present disclosure, as described above, a small base station can flexibly be operated according to conditions. The above effect is not necessarily limited and with the above effect or in place of the above effect, one of effects described herein or another effect grasped from herein may be achieved.

BRIEF DESCRIPTION OF DRAWINGS

FIG. 1 is an explanatory view showing an example of a schematic configuration of a communication system 1 according to an embodiment of the present disclosure.

FIG. 2 is a block diagram showing an example of the configuration of a macro base station according to a first embodiment.

FIG. 3 is an explanatory view illustrating an example of arrangement of terminal devices in a macro cell.

FIG. 4 is an explanatory view illustrating a concrete example of a result of measurement by the terminal device.

FIG. 5 is an explanatory view illustrating a first switching example of an operation mode in units of component carriers (CC).

FIG. 6 is an explanatory view illustrating a first switching example of the operation mode in units of small base stations.

FIG. 7 is an explanatory view illustrating an example of arrangement of terminal devices in the macro cell.

FIG. 8 is an explanatory view illustrating a concrete example of measurement results by the terminal device.

FIG. 9 is an explanatory view illustrating a second switching example of the operation mode in units of component carriers (CC).

FIG. 10 is an explanatory view illustrating a second switching example of the operation mode in units of small base stations.

FIG. 11 is a sequence diagram showing a first example of a schematic flow of a communication control process according to the first embodiment.

FIG. 12 is a flow chart showing a second example of the schematic flow of the communication control process according to the first embodiment.

FIG. 13 is a sequence diagram showing a first example of the schematic flow of the communication control process according to a first modification of the first embodiment.

FIG. 14 is a sequence diagram showing a second example of the schematic flow of the communication control process according to a first modification of the first embodiment.

FIG. 15 is a sequence diagram showing an example of the schematic flow of the communication control process according to a third modification of the first embodiment.

FIG. 16 is a block diagram showing an example of the configuration of a macro base station according to a second embodiment.

FIG. 17 is a sequence diagram showing an example of the schematic flow of the communication control process according to the second embodiment.

FIG. 18 is a sequence diagram showing an example of the schematic flow of the communication control process according to a second modification of the second embodiment.

FIG. 19 is a sequence diagram showing an example of the schematic flow of the communication control process according to a third modification of the second embodiment.

FIG. 20 is a sequence diagram showing an example of the schematic flow of the communication control process according to a fourth modification of the second embodiment.

FIG. 21 is a block diagram showing a first example of the schematic configuration of eNB to which technology according to the present disclosure can be applied.

FIG. 22 is a block diagram showing a second example of the schematic configuration of eNB to which technology according to the present disclosure can be applied.

FIG. 23 is a block diagram showing an example of the schematic configuration of a server to which technology according to the present disclosure can be applied.

DESCRIPTION OF EMBODIMENTS

Hereinafter, preferred embodiments of the present disclosure will be described in detail with reference to the appended drawings. Note that, in this specification and the drawings, elements that have substantially the same function and structure are denoted with the same reference signs, and a repeated explanation is omitted.

Also, in this specification and the drawings, elements that have substantially the same function and structure may be distinguished by attaching different alphabets after the same reference sign. For example, a plurality of elements that have substantially the same function and structure may be distinguished like terminal devices 300A, 300B, 300C when necessary. However, when there is no particular need to distinguish each of a plurality of elements having substantially the same function and structure, only the same reference sign is attached. For example, when there is no particular need to distinguish the terminal devices 300A, 300B, 300C, the terminal devices are simply called terminal devices 300.

The description will be provided in the order shown below:

1. Schematic Configuration of Communication system
2. First Embodiment
  2.1. Configuration of Macro Base Station
  2.2. Switching of Operation Mode from First Mode to Second Mode
  2.3. Switching of Operation Mode from Second Mode to First Mode
  2.4. Flow of Process
  2.5. First Modification
  2.6. Second Modification
  2.7. Third Modification 3. Second Modification
3.1. Configuration of Macro Base Station
3.2. Flow of Process
3.3. First Modification
3.4. Second Modification
3.5. Third Modification
3.6. Fourth Modification
4. Application Example
4.1. Application Examples concerning Base Station
4.2. Application Example concerning Control Entity
5. Summary <<1. Schematic Configuration of Communication System>>

First, a schematic configuration of the communication system 1 according to an embodiment of the present disclosure will be described with reference to FIG. 1. FIG. 1 is an explanatory view showing an example of the schematic configuration of the communication system 1 according to the present embodiment. Referring to FIG. 1, the communication system 1 includes a macro base station 100, a small base station 200, a terminal device 300, and a control entity 400.

The macro base station 100 is a base station of a macro cell 10 and performs wireless communication with the terminal device 300 positioned inside the macro cell 10. In addition, for example, the macro base station 100 communicates with the small base station 200 and the control entity 400 via a backhaul.

The small base station 200 is a base station of a small cell 20 overlapping with a portion or all of the macro cell 10 and performs wireless communication with the terminal device 300 positioned inside the small cell 20. In addition, for example, the small base station 200 communicates with the macro base station 100 the small base station 200 via the backhaul. The small base station 200 may also communicate with the control entity 400 via the backhaul. The small cell 20 is a cell smaller than the macro cell 10 and one of a variety of cells such as a picocell, a femtocell, and a micro cell.

When positioned inside the macro cell 10, the terminal device 300 performs wireless communication with the macro base station 100. When positioned inside the small cell 20, the terminal device 300 performs wireless communication with the small base station 200. The terminal device 300 may also communicate with the control entity 400 via the macro base station 100 or the small base station 200.

The control entity 400 performs control in the communication system 1. For example, the control entity 400 performs control related to wireless communication in the macro cell 10 and the small cell 20. For example, the control entity 400 communicates with the macro base station 100 via the backhaul. The control entity 400 may also communicate with the small base station 200 via the backhaul. The control entity 400 may also communicate with the terminal device 300 via the macro base station 100 or the small base station 200. The control entity 400 is, for example, a core network node.

<<2. First Embodiment>>

Subsequently, the first embodiment in the present disclosure will be described with reference to FIGS. 2 to 15.

According to the first embodiment in the present disclosure, switching of an operation mode in the small base station 200 wherein one of a first mode and a second mode is switched to the other is controlled based on a measurement result by the terminal device 300. The first mode is a mode in which the small base station 200 can perform wireless communication with a device inside the small cell 20 and the second mode is a mode that consumes less power than the first mode.

Accordingly, for example, the small base station 200 can flexibly be operated in accordance with conditions. As a result, power consumption of the small base station 200 can further be reduced.

<2.1. Configuration of Macro Base Station>

First, an example of the configuration of a macro base station 100-1 according to the first embodiment will be described with reference to FIG. 2. FIG. 2 is a block diagram showing an example of the configuration of the macro base station 100-1 according to the first embodiment. Referring to FIG. 2, the macro base station 100-1 includes an antenna unit 110, a wireless communication unit 120, a network communication unit 130, a storage unit 140, and a processing unit 150.

(Antenna Unit 110)

The antenna unit 110 radiates a signal output by the wireless communication unit 120 into the space as a radio wave. The antenna unit 110 also converts a radio wave in the space into a signal and outputs the signal to the wireless communication unit 120.

(Wireless Communication Unit 120)

The wireless communication unit 120 performs wireless communication. For example, the wireless communication unit 120 transmits a down link signal to a terminal device 300-1 positioned inside the macro cell 10 and receives an up link signal from the terminal device 300-1 positioned inside the macro cell 10.

(Network Communication Unit 130)

The network communication unit 130 communicates with other nodes. For example, the network communication unit 130 communicates with a small base station 200-1 via the backhaul. The network communication unit 130 also communicates with a control entity 400-1 via the backhaul. The backhaul here may a wire means or a wireless means.

(Storage Unit 140)

The storage unit 140 stores programs and data for the operation of the macro base station 100-1 temporarily or permanently. The programs or data may dynamically be rewritten via the wireless communication unit 120 or the network communication unit 130.

(Processing Unit 150)

The processing unit 150 provides various functions of the macro base station 100-1. The processing unit 150 includes a requesting unit 151, an information acquisition unit 153, and a control unit 155.

(Requesting Unit 151)

The requesting unit 151 requests reporting or offering of a result of measurement by the terminal device 300-1.

Measurement

For example, the communication system 1 is a system according to LTE. In this case, the measurement includes measurement of reference signal received power (RSRP). The measurement may also include received signal received quality (RSRQ). The measurement may also include measurement of signal-to-interference and noise power ratio (SINR) and/or channel quality indicator (CQI).

As another example, the communication system 1 may a system according to universal mobile telecommunications system (UMTS). In this case, the measurement may include measurement of, for example, received signal code power (RSCP) as received intensity of a pilot signal. The measurement may also include measurement of energy per chip divided by the noise power density (Ec/No), signal-to-interference and noise power ratio (SINR) and/or channel quality indicator (CQI).

As still another example, the communication system 1 may a system according to evolution data only (EV-DO) (Optimized). In this case, the measurement may include measurement of RSCP or energy per chip divided by the interference power density (Ec/Io). The measurement may also include measurement of SINR and/or data rate control bit (DRC).

However, the measurement is not limited to the aforementioned first to third examples. The measurement may naturally be measurement of other measuring items. For example, the measurement may be measurement of indexes equivalent to measuring items according to the aforementioned first to third examples.

Request

Technique of Request

As a first example, the requesting unit 151 requests the small base station 200-1 to provide a result of measurement by the terminal device 300-1 via the network communication unit 130. Then, the small base station 200-1 requests the one or more terminal devices 300-1 to report a result of measurement and the one or more terminal devices 300-1 report a result of measurement to the small base station 200-1. Then, the small base station 200-1 provides the result of the measurement to the macro base station 100-1. Thereafter, the result of the measurement is stored in the storage unit 140.

More specifically, for example, the requesting unit 151 requests each of the small base stations 200-1 to provide a result of measurement by each of the terminal devices 300-1 connected to the small base station via the network communication unit 130. As a result, each of the base stations 200-1 provides a result of measurement by each of the terminal devices 300-1 connected to the small base station to the macro base station 100-1. A result of measurement by each of the terminal devices 300-1 may contain a result of measurement by the macro base station 100-1 and/or a result of measurement by the small base station 200-1 other than the small base station 200-1 to which the terminal device 300-1 is connected.

As a second example, the requesting unit 151 requests the one or more terminal devices 300-1 to report a result of measurement via the wireless communication unit 120. Then, the one or more terminal devices 300-1 report a result of measurement to the macro base station 100-1. Thereafter, the result of the measurement is stored in the storage unit 140.

More specifically, for example, the requesting unit 151 requests each of the terminal devices 300-1 connected to the macro base station 100-1 to report a result of measurement via the wireless communication unit 120. As a result, each of the terminal devices 300-1 connected to the macro base station 100-1 reports a result of measurement to the macro base station 100-1. A result of measurement by each of the terminal devices 300-1 may contain a result of measurement by the macro base station 100-1 and/or a result of measurement by the one or more small base stations 200-1.

With the above operation, for example, all the terminal devices 300-1 positioned inside the macro cell 10 and connected to one of base stations report results of measurement.

A request to the terminal 300-1 is made by transmitting, for example, an RRC (Radio Resource Control) connection reconfiguration message (RRC Connection Reconfiguration message) to the terminal device 300-1.

Content of Request

When requesting offering or reporting of a result of measurement by the terminal device 300-1, the requesting unit 151 specifies measurement objects, measuring items, and/or reporting techniques.

The measurement objects are, for example, cells or base stations. The measuring items include, for example, RSRP.

The reporting technique is, for example, periodic reporting or event-triggered reporting. According to the periodic reporting, a result of measurement is reported in periodic timing and according to the event-triggered reporting, a result of measurement is reported in timing of an event occurrence. For example, to collect results of measurement by all the terminal devices 300-1 within a predetermined interval, it is desirable to provide periodic reporting. Thus, as the reporting technique, for example, the periodic reporting is specified. In this case, for example, the measuring interval is further specified. Then, a result of measurement in the measuring interval is reported by the terminal device 300-1. Alternatively, a reporting period may further be specified so that measurement and reporting are done in the reporting period. Alternatively, a reporting interval may be specified so that measurement and reporting are done in the reporting period during the reporting interval.

Incidentally, for example, the aforementioned RRC connection reconfiguration message contains measurement objects, measuring items and/or reporting techniques. Accordingly, measurement objects, measuring items and/or reporting techniques are specified.

For example, as described above, the requesting unit 151 requests reporting or offering of a result of measurement by the terminal device 300-1. Accordingly, for example, even when handover is normally not necessary, a result of measurement by the terminal device 300 can be obtained in accordance with necessity on the network side.

(Information Acquisition Unit 153)

The information acquisition unit 153 acquires a result of measurement by the terminal device 300-1.

For example, as described above, a result of measurement by the terminal device 300-1 is provided to the macro base station 100-1 in response to a request from the requesting unit 151 and stored in the storage unit 140. Then, the information acquisition unit 153 acquires the result of the measurement stored in the storage unit 140.

(Control Unit 155)

The control unit 155 control switching of the operation mode of the small base station 200 based on a result of measurement by the terminal device 300-1. The switching is switching of the operation mode from one of the first mode and the second mode to the other.

The First Mode and Second Mode

The first mode is a mode in which the small base station 200-1 can perform wireless communication with a device inside the small cell 20. The first mode is, for example, a normal mode in which the small base station 200-1 performs normal wireless communication.

On the other hand, the second mode is a mode that consumes less power than the first mode. The second mode is, for example, a mode in which a signal processing circuit continuously or discontinuously stops for at least the wireless communication. The signal processing circuit contains at least one of, for example, a signal processing circuit to process a radio frequency (RF) signal, a signal processing circuit to process to process a base band signal, and a signal processing circuit of a still upper layer. In other words, the second mode is a mode in which the small base station 200-1 does not perform wireless communication continuously or discontinuously. The second mode is, for example, a stop mode in which the signal processing circuit continuously stops or a power saving mode in which the signal processing circuit discontinuously stops.

From the above, for example, the control unit 155 controls switching of the operation mode from one of the normal mode and the stop mode (or the power saving mode) to the other based on a result of measurement by the terminal device 300-1.

Type of Switching

The switching of the operation mode includes switching of the operation mode from the first mode (for example, the normal mode) to the second mode (for example, the stop mode or the power saving mode) and switching of the operation mode from the second mode to the first mode. The operation of the macro base station 100 in each of such two switching cases will be described in detail below.

Control of Switching

Determination of Switching

For example, controlling the switching includes determining to perform the switching. That is, the control unit 155 determines to perform the switching based on a result of measurement by the terminal device 300-1. More specifically, for example, the control unit 155 determines to perform the switching when the result of the measurement satisfies predetermined conditions and does not determine to perform the switching when the result of the measurement does not satisfy the predetermined conditions.

Trigger of Switching

Also, for example, controlling the switching includes triggering the switching by the small base station 200-1 when determined to perform the switching. More specifically, for example, the control unit 155 instructs the small base station 200-1 to perform the switching of the operation mode via the network communication unit 130.

<2.2. Switching of Operation Mode from First Mode to Second Mode (First Switching)>

As described above, the switching is, for example, switching (hereinafter, called "first switching") of the operation mode from the first mode (for example, the normal mode) to the second mode (for example, the stop mode or the power saving mode). Hereinafter, the operation of the macro base station 100 in a case of the first switching will be described more concretely.

(Requesting Unit 151)

Request

Content of Request

In the case of the first switching, the requesting unit 151 specifies the one or more small cells 20 as measurement objects. As a result, each of the terminal devices 300-1 reports a result of measurement of the one or more small cells 20.

More specifically, for example, the requesting unit 151 specifies the macro cell 10 and all the small cells 20 as measurement objects. As a result, each of the terminal devices 300-1 reports a result of measurement of the macro cell 10 and all the small cells 20.

(Information Aquisition Unit 153)

The information acquisition unit 153 acquires a result of measurement by the terminal device 300-1. In the case of the first switching, the result of the measurement includes a result of measurement of the small cells 20.

Cells to be Measured

For example, as described above, each of the terminal devices 300-1 reports a result of measurement of the one or more small cells 20. In this case, the information acquisition unit 153 acquires a result of measurement of the one or more small cells 20.

More specifically, for example, as described above, each of the terminal devices 300-1 reports a result of measurement of the macro cell 10 and all the small cells 20. In this case, the information acquisition unit 153 acquires a result of measurement of the macro cell 10 and all the small cells 20.

Terminal Device as a Measuring Subject

As described above, for example, all the terminal devices 300-1 positioned inside the macro cell 10 and connected to one of base stations report results of measurement. In this case, the information acquisition unit 153 acquires results of measurement by all the terminal devices 300-1.

Concrete Example of a Result of Measurement

A concrete example of an acquired result of measurement will be described below with reference to FIGS. 3 and 4.

FIG. 3 is an explanatory view illustrating an example of arrangement of the terminal devices 300-1 in the macro cell 10. Referring to FIG. 3, the macro base station 100-1 whose cell ID is #1 and three small base stations 200-1A to 200-1C whose cell IDs are #2 to #4 are shown. In this example, the macro base station 100-1 and the small base stations 200-1A to 200-1C all operate in normal mode (first mode). Further, nine terminal devices 300-1A to 300-1I whose terminal IDs are #1 to #9 are shown. In this example, the three terminal devices 300-1A to 300-1C whose terminal IDs are #1 to #3 are connected to the macro base station 100-1 to perform wireless communication in the macro cell 10. The three terminal devices 300-1D to 300-1F whose terminal IDs are #4 to #6 are connected to the small base station 200-1A whose cell ID is #2 to perform wireless communication in a small cell 20A. The three terminal devices 300-1G to 300-1I whose terminal IDs are #7 to #9 are connected to the small base station 200-1C whose cell ID is #4 to perform wireless communication in a small cell 20C.

FIG. 4 is an explanatory view illustrating a concrete example of a result of measurement by the terminal device 300-1. The example in FIG. 4 is an example of a result of measurement when the terminal devices 300-1 are arranged as shown in FIG. 3. Referring to FIG. 4, results of measurement of four cells (that is, the macro cell 10 whose cell ID is #1 and the small cells 20A to 20C whose cell IDs are #2 to #4) by nine terminal devices whose terminal IDs are #1 to #9 are shown. In this example, results of measurement are in RSRP. For example, RSRP_00 indicates RSRP of less than −140 dBm. RSRP_N (N is more than or equal to 1) indicates RSRP of {−140-(N−1)} dBm or more and less than (−140-N) dBm. For example, RSRP_01 indicates RSRP of −140 dBm or more and less than −139 dBm.

(Control Unit 155)

Type of Switching

In the case of the first switching, the switching is switching (that is, the first switching) of the operation mode from the first mode (for example, the normal mode) to the second mode (for example, the stop mode or the power saving mode).

Control of Switching

Determination of Switching

The control unit 155 determines to perform the first switching (that is, switching of the operation mode from the first mode to the second mode) based on, for example, a result of measurement by the terminal device 300-1.

More specifically, for example, the control unit 155 determines to perform the first switching of the operation mode of any of the small base stations 200-1 whose operation mode is the first mode (for example, the normal mode) based on results of measurement of all the terminal devices 300-1 positioned inside the macro cell 10 and connected to one of base stations.

As a first example, the control unit 155 calculates an average value of results of measurement by all the terminal devices 300-1 in each of the small cells 20 and determines the first switching based on the average value. For example, the control unit 155 calculates an average value of RSRP measured by all the terminal devices 300-1 in each of the small cells 20 and determines the first switching if the average value is equal to or less than a predetermined threshold. That is, the control unit 155 determines to perform the first switching (for example, switching from the normal mode to the stop mode or the power saving mode) of the small base station 200-1 when conditions of communication between the small base station 200-1 and the terminal device 300-1 are not good. The predetermined threshold may be any value or dynamically change on the time axis.

Referring to the examples in FIGS. 3 and 4 again as concrete examples, for example, the average value of RSRP of the small cell 20B whose cell ID is #3 is very low and is equal to or less than the predetermined threshold. Thus, the control unit 155 determines to perform the first switching (for example, switching from the normal mode to the stop mode or the power saving mode) of the small base station 200-1B.

As a second example, the control unit 155 may count the number of the terminal devices 300-1 whose result of measurement satisfies a predetermined condition for each of the small cells 20 to determine the first switching based on the number of the terminal devices 300-1. For example, the predetermined condition is that RSRP is equal to RSRP_50 or more. Then, the control unit 155 may determine to perform the first switching if the number of the terminal devices 300-1 whose RSRP is equal to RSRP_50 or more is equal to a predetermined number or less for each of the small cells 20. The predetermined number may be any number or dynamically change on the time axis. In addition, a different number may be set to each of the small cells 20 as the predetermined number.

Referring to the examples in FIGS. 3 and 4 again as concrete examples, for example, the number of the terminal devices 300-1 whose RSRP is equal to RSRP_50 or more is three for the small cell 20A (cell ID: #2), zero for the small cell 20B (cell ID: #3), and three for the small cell 20C (cell ID: #4). If, for example, the predetermined number is one, the number of the terminal devices 300-1 for the small cell 20B (cell ID: #3) is equal to the predetermined number or less. Thus, the control unit 155 determines to perform the first switching (for example, switching from the normal mode to the stop mode or the power saving mode) of the small base station 200-1B.

An example in which the result of the measurement is RSRP is described above, but the result of the measurement may naturally be other than RSRP. For example, the result of the measurement may be an index calculated from RSCP, RSRQ, SINR, El/No, Ec/Io, CQI, DRC or any combination of a plurality of the above.

Also an example in which a determination to perform the first switching is made based on results of measurement by all the terminal devices 300-1 connected to one of base stations is described above, but the determination of the first switching is not limited to such an example. For example, a determination to perform the first switching may be made based on results of measurement by some of the terminal devices 300-1 of all the terminal devices 300-1. As an example, a determination to perform the first switching of the small base station 200-1 may be made based on results of measurement by at least a portion of the terminal devices 300-1 connected to the small base station 200-1.

Trigger of Switching

When, for example, a determination to perform the first switching is made, the control unit 155 triggers the first switching (that is, switching of the operation mode from the first mode to the second mode) by the small base station 200-1. More specifically, for example, the control unit 155 instructs the small base station 200 to perform the first switching via the network communication unit 130.

Determination of Handover Destination

For example, controlling the switching includes determining a handover destination of the terminal device 300-1 connected to the small base station 200-1. That is, the control unit 155 determines the handover destination of the terminal device 300-1 based on, for example, a result of measurement by the terminal device 300-1 connected to the small base station 200-1 whose operation mode is switched.

Specifically, for example, the control unit 155 determines a base station other than the small base station 200-1 as the handover destination based on the result of the measurement. For example, the control unit 155 determines the macro base station 100-1 (or the macro cell 10) or the other small base station 200-1 (or the other small cell 20) as the handover destination. As an example, the control unit 155 determines the base station (or the cell) corresponding to the largest RSRP of RSRP measured by the terminal device 300-1 as the handover destination of the terminal device 300-1.

For example, the first switching (that is, switching of the operation mode from the first mode to the second mode) is controlled as described above. Accordingly, for example, the small base station 200-1 can flexibly be operated in accordance with conditions.

More specifically, even if, for example, any one of the terminal devices 300-1 is present inside the small cell 20, the small base station 200-1 of the small cell 20 can be stopped or caused to operate in power saving mode if it is difficult to expect a sufficient effect (for example, offloading of traffic) by the small cell 20. As a result, power consumption of the small base station 200-1 can further be reduced. In addition, interference caused by the small base station 200-1 can be reduced.

Even when, for example, as described above, the terminal device 300-1 connected to the small base station 200-1 whose operation mode is switched is present, the handover of the terminal device 300-1 is performed. Accordingly, for example, after the small base station 200-1 is stopped or caused to operate in power saving mode, the terminal device 300-1 can continue to communicate.

(Case of Carrier Aggregation)

For example, the macro base station 100-1 and/or the small base station 200-1 and the terminal device 300-1 can support carrier aggregation. That is, the macro base station 100-1 and/or the small base station 200-1 can perform wireless communication with the one terminal device 300-1 using a plurality of frequency bands. Also, the terminal device 300-1 can perform wireless communication with the macro base station 100-1 or the small base station 200-1 using a plurality of frequency bands. Each of the plurality of frequency bands is, for example, a component carrier (CC).

Measurement

In the case of carrier aggregation, for example, a result of measurement by the terminal device 300-1 include a result of measurement of each of a plurality of frequency bands (for example, a plurality of CC). When, for example, three CC are used, the result of the measurement by the terminal device 300-1 includes a result of measurement of each of the three CC. The aforementioned RRC connection reconfiguration message may contain information about each CC as a measurement object.

Switching of the Operation Mode

In the case of carrier aggregation, the first switching of the operation mode of the small base station 200-1 is switching, for example, in units of frequency bands (for example, CC). That is, the operation mode of the small base station 200-1 is switched from the first mode to the second mode not in units of the small base stations 200-1, but in units of frequency bands (for example, CC) used by the small base station 200-1. A concrete example of this point will be described with reference to FIG. 5.

FIG. 5 is an explanatory view illustrating a first switching example of the operation mode in units of component carriers (CC). Referring to FIG. 5, three CC (CC#1 to CC#3) used in each of the macro cell 10 (cell ID: #1), the small cell 20A (cell ID: #2), the small cell 20B (cell ID: #3), and the small cell 20C (cell ID: #4) are shown. In this example, the operation mode of the three CC is the first mode (normal mode) in each of the cells. In this case, each of the terminal devices 300-1 makes measurement of each CC in each of the macro cell 10, the small cell 20A, the small cell 20B, and the small cell 20C and reports a result of measurement of each CC. As an example, the result of the measurement is RSRP. Then, for example, the average value of RSRP of CC#3 in the small cell 20B (cell ID: #3) is less than the threshold. Alternatively, the number of the terminal devices 300-1 whose RSRP is equal to RSRP_50 or more is equal to the predetermined number or less for CC#3 of the small cell 20B (cell ID: #3). In this case, switching of the operation mode from the first mode (normal mode) to the second mode (for example, the stop mode or the power saving mode) is determined for CC#3 of the small base station 200-1B. Thereafter, the operation mode of CC#3 of the small base station 200-1B is switched to the second mode.

By switching in units of frequency bands (for example, CC) as described above, for example, the small base station 200-1 can be operated more flexibly. More specifically, if, for example, it is difficult to expect a sufficient effect (for example, offloading of traffic) from a portion of frequency bands of a plurality of frequency bands in the small cell 20, the small base station 200-1 can be stopped or caused to operate in power saving mode for the portion of frequency bands. As a result, power consumption of the small base station 200-1 can further be reduced. In addition, interference caused by the small base station 200-1 can be reduced.

Even in the case of carrier aggregation, the operation mode may be switched in units of the small base stations 200-1, instead of in units of frequency bands (for example, CC). A concrete example of this point will be described with reference to FIG. 6.

FIG. 6 is an explanatory view illustrating a first switching example of the operation mode in units of small base stations. Also in the example of FIG. 6, like the example in FIG. 5, each of the terminal devices 300-1 makes measurement of each CC in each of the macro cell 10, the small cell 20A, the small cell 20B, and the small cell 20C and reports a result of measurement of each CC. Then, for example, the average value of RSRP of any of CC#1 to CC#3 in the small cell 20B (cell ID: #3) is less than the threshold. Alternatively, the number of the terminal devices 300-1 whose RSRP is equal to RSRP_50 or more is equal to the predetermined number or less for any of CC#1 to CC#3 of the small cell 20B (cell ID: #3). In this case, switching of the operation mode of the small base station 200-1B from the first mode (normal mode) to the second mode (for example, the stop mode or the power saving mode) is determined. Thereafter, the operation mode of the whole small base station 200-1B (that is, the operation mode of CC#1 to CC#3) is switched to the second mode.

Determination of Handover Destination

In the case of carrier aggregation, instead of determining another cell (or another base station), the control unit 155 may determine another frequency band (for example, CC) in the same small cell (or the same small base station 200-1) as the handover destination. Incidentally, handover in the case of carrier aggregation is, for example, handover of a primary component carrier (PCC).

<2.3. Switching of Operation Mode from Second Mode to First Mode (Second Switching)>

As described above, the switching is, for example, switching (hereinafter, called "second switching") of the operation mode from the second mode (for example, the stop mode or the power saving mode) to the first mode (for example, the normal mode). Hereinafter, the operation of the macro base station 100 in the case of the second switching will be described more concretely.

(Requesting Unit 151)

Request

Content of Request

In the case of the second switching, the requesting unit 151 specifies the macro cell 10 and/or the small cell 20 of the one or more small base stations 200-1 whose operation mode is the first mode as measurement objects. As a result, each of the terminal devices 300-1 reports a result of measurement of the macro cell 10 and/or the small cell 20.

More specifically, for example, the requesting unit 151 specifies the macro cell 10 and the small cells 20 of all the small base stations 200-1 whose operation mode is the first mode as measurement objects. As a result, each of the terminal devices 300-1 reports a result of measurement of the macro cell 10 and the small cells 20.

(Information Acquisition Unit 153)

The information acquisition unit 153 acquires a result of measurement by the terminal device 300-1. In the case of the second switching, for example, the result of the measurement includes a result of measurement one or more other cells than the small cell 20 of the small base station 200-1 whose operation mode is the second mode (for example, the stop mode or the power saving mode). That is, the result of the measurement includes a result of measurement of small cells of the one or more small base stations 200-1 whose operation mode is the first mode (for example, the normal mode).

Cells to be Measured

For example, as described above, each of the terminal devices 300-1 reports a result of measurement of the macro cell 10 and/or the small cells 20 of the one or more small base stations 200-1 whose operation mode is the first mode. In this case, the information acquisition unit 153 acquires a result of measurement of the macro cell 10 and/or the small cells 20.

More specifically, for example, each of the terminal devices 300-1 reports a result of measurement of the macro cell 10 and the small cells 20 of all the small base stations 200-1 whose operation mode is the first mode. In this case, the information acquisition unit 153 acquires a result of measurement of the macro cell 10 and the small cells 20.

Terminal Device as a Measuring Subject

As described above, for example, all the terminal devices 300-1 positioned inside the macro cell 10 and connected to one of base stations report results of measurement. In this case, the information acquisition unit 153 acquires results of measurement by all the terminal devices 300-1.

Concrete Example of a Result of Measurement

A concrete example of an acquired result of measurement will be described below with reference to FIGS. 7 and 8.

FIG. 7 is an explanatory view illustrating an example of arrangement of the terminal devices 300-1 in the macro cell 10. Referring to FIG. 7, the macro base station 100-1 whose cell ID is #1 and three small base stations 200-1A to 200-1C whose cell IDs are #2 to #4 are shown. In this example, the macro base station 100-1, the small base station 200-1A, and the small base station 200-1C operate in normal mode (first mode). On the other hand, the small base station 200-1B operates in stop mode or power saving mode (second mode). Further, 11 terminal devices 300-1A to 300-1K whose terminal IDs are #1 to #11 are shown. In this example, the five terminal devices 300-1A to 300-1C, 300-1J, and 300-1K whose terminal IDs are #1 to #3, #10, and #11 are connected to the macro base station 100-1 to perform wireless communication in the macro cell 10. The three terminal devices 300-1D to 300-1F whose terminal IDs are #4 to #6 are connected to the small base station 200-1A whose cell ID is #2 to perform wireless communication in a small cell 20A. The three terminal devices 300-1G to 300-1I whose terminal IDs are #7 to #9 are connected to the small base station 200-1C whose cell ID is #4 to perform wireless communication in a small cell 20C.

FIG. 8 is an explanatory view illustrating a concrete example of a result of measurement by the terminal device 300-1. The example in FIG. 8 is an example of a result of measurement when the terminal devices 300-1 are arranged as shown in FIG. 7. Referring to FIG. 8, results of measurement of three cells (that is, the macro cell 10 whose cell ID is #1 and the small cells 20A and 20C whose cell IDs are #2 and #4) by eleven terminal devices whose terminal IDs are #1 to #11 are shown. In this example, results of measurement are in RSRP. As described above, RSRP_00 indicates RSRP of less than −140 dBm. RSRP_N (N is more than or equal to 1) indicates RSRP of {−140-(N−1)} dBm or more and less than (−140−N) dBm. For example, RSRP_01 indicates RSRP of −140 dBm or more and less than −139 dBm.

(Control Unit 155)

Type of Switching

In the case of the second switching, the switching is switching (that is, the second switching) of the operation mode from the second mode (for example, the stop mode or the power saving mode) to the first mode (for example, the normal mode).

Control of Switching

Determination of Switching

The control unit 155 determines to perform the second switching (that is, switching of the operation mode from the second mode to the first mode) based on, for example, a result of measurement by the terminal device 300-1.

More specifically, for example, the control unit 155 determines to perform the second switching of the operation mode of any of the small base stations 200-1 whose operation mode is the second mode (for example, the stop mode or the power saving mode) based on results of measurement of all the terminal devices 300-1 positioned inside the macro cell 10 and connected to one of base stations.

As a first example, when RSRP measured by one of the terminal devices 300-1 is equal to the predetermined threshold or less in all cells to be measured, the control unit 155 determines to perform the second switching of one of the small base stations 200-1 whose operation mode is the second mode. That is, if the terminal device 300-1 incapable of obtaining sufficient communication quality in any cell is present, the control unit 155 determines to perform the second switching (for example, switching from the stop mode or the power saving mode to the normal mode) of one of the small base stations 200-1 whose operation mode is the second mode (the stop mode or the power saving mode). Accordingly, the terminal device 300-1 may be able to obtain sufficient communication quality from the small base station 200-1 whose operation mode is switched to the first mode. The predetermined threshold may be any value or dynamically change on the time axis.

Referring to the examples of FIGS. 7 and 8 as concrete examples, RSRP of the four terminal devices 300-1 (terminal IDs: #1, #2, #10, #11) is equal to the predetermined threshold (for example, RSRP_35) or less in all of the macro cell 10 and the small cells 20A, 20C (cell IDs: #1, #2, #4). Thus, the control unit 155 determines to perform the second switching (for example, switching from the stop mode or the power saving mode to the normal mode) of the small base station 200-1B.

As a second example, when RSRP measured by as many as the predetermined number or more of the terminal devices 300-1 is equal to the predetermined threshold or less in all cells to be measured, the control unit 155 determines to perform the second switching of one of the small base stations 200-1 whose operation mode is the second mode. That is, if the number of the terminal devices 300-1 incapable of obtaining sufficient communication quality in all cells is large, it is determined to perform the second switching (for example, switching from the stop mode or the power saving mode to the normal mode) of one of the small base stations 200-1 whose operation mode is the second mode (the stop mode or the power saving mode). Accordingly, the terminal device 300-1 may be able to obtain sufficient communication quality from the small base station 200-1 whose operation mode is switched to the first mode. The predetermined number may be any number or dynamically change on the time axis. The predetermined threshold may also be any value or dynamically change on the time axis.

Referring to the examples of FIGS. 7 and 8 as concrete examples, RSRP measured by as many as more than a predetermined number (three, for example), that is four, of terminal devices 300-1 (terminal IDs: #1, #2, #10, #11) is equal to the predetermined threshold (for example, RSRP 35) or less in all of the macro cell 10 and the small cells 20A, 20C (cell IDs: #1, #2, #4). Thus, the control unit 155 determines to perform the second switching (for example, switching from the stop mode or the power saving mode to the normal mode) of the small base station 200-1B.

An example in which the result of the measurement is RSRP is described above, but the result of the measurement may naturally be other than RSRP. For example, the result of the measurement may be an index calculated from RSCP, RSRQ, SINR, Ec/No, Ec/Io, CQI, DRC or any combination of a plurality of the above.

Also an example in which a determination to perform the second switching is made based on results of measurement by all the terminal devices 300-1 connected to one of base stations is described above, but the determination of the second switching is not limited to such an example. For example, a determination to perform the second switching may be made based on results of measurement by a portion of the terminal devices 300-1 of all the terminal devices 300-1.

Trigger of Switching

When, for example, a determination to perform the second switching is made, the control unit 155 triggers the second switching (that is, switching of the operation mode from the second mode to the first mode) by the small base station 200-1. More specifically, for example, the control unit 155 instructs the small base station 200-1 to perform the second switching via the network communication unit 130.

For example, the second switching (that is, switching of the operation mode from the second mode to the first mode) is controlled as described above. Accordingly, for example, the small base station can flexibly be operated in accordance with conditions.

More specifically, if, for example, a terminal present in the small cell 20 is incapable of performing communication satisfactorily in other cells (for example, the macro cell), the small base station 200-1 restarts communication. Accordingly, the terminal may be made to be able to perform communication satisfactorily in the small cell 20. On the other hand, even if a terminal is present in the small cell 20, the small base station 200-1 can continue to stop or operate in power saving mode if the terminal can communicate satisfactorily in another cell (for example, the macro cell). As a result, power consumption of the small base station 200-1 can further be reduced. In addition, interference caused by the small base station 200-1 can be reduced.

(Case of Carrier Aggregation)

For example, the macro base station 100-1 and/or the small base station 200-1 and the terminal device 300-1 can support carrier aggregation. That is, the macro base station 100-1 and/or the small base station 200-1 can perform wireless communication with the one terminal device 300-1 using a plurality of frequency bands. Also, the terminal device 300-1 can perform wireless communication with the macro base station 100-1 or the small base station 200-1 using a plurality of frequency bands. Each of the plurality of frequency bands is, for example, a component carrier (CC).

Measurement

In the case of carrier aggregation, for example, a result of measurement by the terminal device 300-1 include a result of measurement of each of a plurality of frequency bands (for example, a plurality of CC). When, for example, three CC are used, the result of the measurement by the terminal device 300-1 includes a result of measurement of each of the three CC. The aforementioned RRC connection reconfiguration message may contain information about each CC as a measurement object.

Switching of the Operation Mode

In the case of carrier aggregation, the second switching of the operation mode of the small base station 200-1 is switching, for example, in units of frequency bands (for example, CC). That is, the operation mode of the small base station 200-1 is switched from the second mode to the first mode not in units of the small base stations 200-1, but in units of frequency bands (for example, CC) used by the small base station 200-1. A concrete example of this point will be described with reference to FIG. 9.

FIG. 9 is an explanatory view illustrating a second switching example of the operation mode in units of component carriers (CC). Referring to FIG. 9, three CC (CC#1 to CC#3) used in each of the macro cell 10 (cell ID: #1), the small cell 20A (cell ID: #2), and the small cell 20C (cell ID: #4) are shown. In this example, the operation mode of the three CC is the first mode (normal mode) in each of the three cells. On the other hand, the operation mode of all three CC in the small cell 20B (cell ID: #3) is the second mode (the stop mode or the power saving mode). In this case, each of the terminal devices 300-1 makes measurement of each CC in each of the macro cell 10, the small cell 20A, and the small cell 20C and reports a result of measurement of each CC. As an example, the result of the measurement is RSRP. Then, for example, RSRP measured by one of the terminal devices 300-1 is equal to the predetermined threshold or less in all of the macro cell 10, the small cell 20A, and the small cell 20C. Alternatively, RSRP measured by as many as the predetermined number or more of the terminal devices 300-1 is equal to the predetermined threshold or less in all of the macro cell 10, the small cell 20A, and the small cell 20C. In this case, it is determined to switch the operation mode of one CC (for example, CC#1) in the small base station 200-1B from the second mode (for example, the stop mode or the power saving mode) to the first mode (normal mode). Thereafter, the operation mode of CC#1 of the small base station 200-1B is switched to the first mode.

By switching in units of frequency bands (for example, CC) as described above, for example, the small base station 200-1 can be operated more flexibly. More specifically, for example, instead of restarting communication in all of a plurality of frequency bands of the small cell 20, the small base station 200-1 can restart communication in a portion of the plurality of frequency bands. As a result, power consumption of the small base station 200-1 can further be reduced. In addition, interference caused by the small base station 200-1 can be reduced.

Even in the case of carrier aggregation, the operation mode may be switched in units of the small base stations 200-1, instead of in units of frequency bands (for example, CC). A concrete example of this point will be described with reference to FIG. 10.

FIG. 10 is an explanatory view illustrating a second switching example of the operation mode in units of small base stations. Also in the example of FIG. 10, like, for example, the example of FIG. 9, each of the terminal devices 300-1 makes measurement of each CC in each of the macro cell 10, the small cell 20A, and the small cell 20C and reports a result of measurement of each CC. Then, for example, RSRP measured by one of the terminal devices 300-1 is equal to the predetermined threshold or less in all of the macro cell 10, the small cell 20A, and the small cell 20C. Alternatively, RSRP measured by as many as the predetermined number or more of the terminal devices 300-1 is equal to the predetermined threshold or less in all of the macro cell 10, the small cell 20A, and the small cell 20C. In this case, switching of the operation mode of the small base station 200-1B from the second mode (for example, the stop mode or the power saving mode) to the first mode (normal mode) is determined. Thereafter, the operation mode of the whole small base station 200-1B (that is, the operation mode of CC#1 to CC#3) is switched to the first mode.

<2.4. Flow of Process>

Next, an example of the communication control process according to the first embodiment will be described with reference to FIGS. 11 and 12.

(First Switching)

FIG. 11 is a sequence diagram showing a first example of a schematic flow of the communication control process according to the first embodiment. The first example is an example of the communication control process for the first switching (that is, switching from the first mode to the second mode).

The macro base station 100-1 requests each of the small base stations 200-1 to provide a result of measurement by each of the terminal devices 300-1 connected to the small base station (S501). Then, each of the small base stations 200-1 requests each of the terminal devices 300-1 connected to the small base station to report a result of measurement (S503). Then, each of the terminal devices 300-1 reports a result of measurement to the small base station 200-1(S505). Thereafter, each of the small base stations 200-1 provides the result of the measurement to the macro base station 100-1 (S507).

The macro base station 100-1 also requests each of the terminal devices 300-1 connected to the macro base station to report a result of measurement (S509). Then, each of the terminal devices 300-1 reports a result of measurement to the macro base station 100-1 (S511).

Then, the macro base station 100-1 determines to perform, for example, the first switching of one of the small base station 200-1 whose operation mode is the first mode (for example, the normal mode) based on a result of measurement by each of the terminal devices 300-1 (S513). For example, performing the first switching of the one or more small base stations 200-1 is determined. The first switching is switching of the operation mode from the first mode (for example, the normal mode) to the second mode (for example, the stop mode or the power saving mode).

The macro base station 100-1 also determines the handover destination of each of the terminal devices 300-1 based on a result of measurement of each of the terminal devices 300-1 connected to the one or more small base stations 200-1 (S515). Then, a handover procedure is performed (S517).

Thereafter, the macro base station 100-1 instructs each of the one or more small base stations 200-1 to perform the first switching (S519). Then, each of the one or more small base stations 200-1 switches the operation mode from the first mode (for example, the normal mode) to the second mode (for example, the stop mode or the power saving mode) (S521).

(Second Switching)

FIG. 12 is a flow chart showing a second example of a schematic flow of the communication control process according to the first embodiment. The second example is an example of the communication control process for the second switching (that is, switching from the second mode to the first mode).

The macro base station 100-1 requests each of the small base stations 200-1 to provide a result of measurement by each of the terminal devices 300-1 connected to the small base station (S531). Then, each of the small base stations 200-1 requests each of the terminal devices 300-1 connected to the small base station to report a result of measurement (S533). Then, each of the terminal devices 300-1 reports a result of measurement to the small base station 200-1 (S535). Thereafter, each of the small base stations 200-1 provides the result of the measurement to the macro base station 100-1 (S537).

The macro base station 100-1 also requests each of the terminal devices 300-1 connected to the macro base station to report a result of measurement (S539). Then, each of the terminal devices 300-1 reports a result of measurement to the macro base station 100-1 (S541).

Then, the macro base station 100-1 determines to perform, for example, the second switching of one of the small base stations 200-1 whose operation mode is the second mode (for example, the stop mode or the power saving mode) based on a result of measurement by each of the terminal devices 300-1 (S543). For example, performing the second switching of the one or more small base stations 200-1 is determined. The second switching is switching of the operation mode from the second mode (for example, the stop mode or the power saving mode) to the first mode (for example, the normal mode).

Thereafter, the macro base station 100-1 instructs each of the one or more small base stations 200-1 to perform the second switching (S545). Then, each of the one or more small base stations 200-1 switches the operation mode from the second mode (for example, the stop mode or the power saving mode) to the first mode (for example, the normal mode) (S547).

<2.5. First Modification>

Next, the first modification of the first embodiment will be described with reference to FIGS. 13 and 14.

In the first embodiment, as described above, control signals and data signals are transmitted and received in, for example, the small cell 20. That is, the small cell 20 transmits and receives both of control plane signals (control signals) and user plane signals (data signals).

In the first modification of the first embodiment, on the other hand, only data signals are transmitted and received in the small cell 20 and control signals are not transmitted and received. Thus, control signals relating to the small cell 20 are transmitted and received by the macro base station 100-1.

In the first modification, for example, carrier aggregation is supported and the terminal device 300-1 communicates with the macro base station 100-1 using PCC and communicates with the small base station 200-1 using a secondary component carrier (SCC). That is, the terminal device 300-1 is connected to the small base station 200-1 via SCC while being connected to the macro base station 100-1 via PCC.

(Macro Base Station 100-1: Requesting Unit 151)

Request

Technique of Request

In the first modification of the first embodiment, the requesting unit 151 requests the one or more terminal devices 300-1 to report a result of measurement via the wireless communication unit 120. Then, the one or more terminal devices 300-1 report a result of measurement to the macro base station 100-1. Thereafter, the result of the measurement is stored in the storage unit 140.

More specifically, for example, the requesting unit 151 requests each of the terminal devices 300-1 to report a result of measurement via the wireless communication unit 120. As a result, each of the terminal devices 300-1 reports a result of measurement to the macro base station 100-1.

(Flow of Process: First Switching)

FIG. 13 is a sequence diagram showing a first example of the schematic flow of the communication control process according to the first modification of the first embodiment. The first example is an example of the communication control process for the first switching (that is, switching from the first mode to the second mode).

The macro base station 100-1 requests each of the terminal devices 300-1 to report a result of measurement (S551). Then, each of the terminal devices 300-1 reports a result of measurement to the macro base station 100-1 (S553).

Then, the macro base station 100-1 determines to perform, for example, the first switching of one of the small base station 200-1 whose operation mode is the first mode (for example, the normal mode) based on a result of measurement by each of the terminal devices 300-1 (S555). For example, performing the first switching of the one or more small base stations 200-1 is determined. The first switching is switching of the operation mode from the first mode (for example, the normal mode) to the second mode (for example, the stop mode or the power saving mode).

Thereafter, the macro base station 100-1 instructs each of the one or more small base stations 200-1 to perform the first switching (S557). Then, each of the one or more small base stations 200-1 switches the operation mode from the first mode (for example, the normal mode) to the second mode (for example, the stop mode or the power saving mode) (S559).

Before the first switching is performed, the handover destination of each of the terminal devices 300-1 connected to each of the one or more small base stations 200-1 may be determined and then a handover procedure may be performed. The handover here may be handover of SCC based on a combination of addition and deletion of SCC. That is, the handover may be handover of SCC based on a combination of deletion of SCC in use and addition of SCC at the handover destination. SCC at the handover destination may be CC of the other small base station 200-1 (the small base station 200-1 other than the small base station 200-1 whose operation mode is switched) or other CC of the same small base station 200-1 (the small base station 200-1 whose operation mode is switched).

(Flow of Process: Second Switching)

FIG. 14 is a sequence diagram showing a second example of the schematic flow of the communication control process according to the first modification of the first embodiment. The first example is an example of the communication control process for the second switching (that is, switching from the second mode to the first mode).

The macro base station 100-1 requests each of the terminal devices 300-1 to report a result of measurement (S571). Then, each of the terminal devices 300-1 reports a result of measurement to the macro base station 100-1 (S573).

Then, the macro base station 100-1 determines to perform, for example, the second switching of one of the small base stations 200-1 whose operation mode is the second mode (for example, the stop mode or the power saving mode) based on a result of measurement by each of the terminal devices 300-1 (S575). For example, performing the second switching of the one or more small base stations 200-1 is determined. The second switching is switching of the operation mode from the second mode (for example, the stop mode or the power saving mode) to the first mode (for example, the normal mode).

Thereafter, the macro base station 100-1 instructs each of the one or more small base stations 200-1 to perform the second switching (S577). Then, each of the one or more small base stations 200-1 switches the operation mode from the second mode (for example, the stop mode or the power saving mode) to the first mode (for example, the normal mode) (S579).

<2.6. Second Modification>

Next, a second modification of the first embodiment will be described.

In the first embodiment, for example, as described above, the macro base station 100-1 includes the requesting unit 151, the information acquisition unit 153, and the control unit 155.

In the second modification of the first embodiment, on the other hand, instead of the macro base station 100-1, the control entity 400-1 includes the information acquisition unit 153 and the control unit 155. Also in the second modification, for example, instead of the macro base station 100-1, the control entity 400-1 further includes the requesting unit 151.

(Control Entity 400-1: Requesting Unit 151)

In the second modification, for example, the control entity 400-1 includes the requesting unit 151. In this case, the requesting unit 151 of the control entity 400-1 requests, for example, the macro base station 100-1 and/or the small base station 200-1 to provide a result of measurement by the terminal device 300-1.

More specifically, for example, the requesting unit 151 requests the macro base station 100-1 to provide a result of measurement by the terminal device 300-1. Then, the macro base station 100-1 requests the terminal device 300-1 to report a result of measurement or the small base station 200-1 to provide a result of measurement by the terminal device 300-1. Then, the macro base station 100-1 acquires a result of measurement by the terminal device 300-1 and provides the result of the measurement to the control entity 400-1.

Also, for example, the requesting unit 151 requests the small base station 200-1 to provide a result of measurement by the terminal device 300-1. Then, the small base station 200-1 requests the terminal device 300-1 to report a result of measurement. And then, the small base station 200-1 acquires a result of measurement by the terminal device 300-1 and provides the result of the measurement to the control entity 400-1.

(Control entity 400-1: information acquisition unit 153)

In the second modification, the control entity 400-1 includes the information acquisition unit 153. In this case, a result of measurement by the terminal device 300-1 is provided to the control entity 400-1 by the macro base station 100-1 or the small base station 200-1 and stored in the control entity 400-1. Then, the information acquisition unit 153 of the control entity 400-1 acquires the result of the measurement by the terminal device 300-1.

(Control Entity 400-1: Control Unit 155)

In the second modification, the control entity 400-1 includes the control unit 155. In this case, for example, the control unit 155 of the control entity 400-1 determines to perform switching of the operation mode of the small base station 200-1 based on the result of the measurement by the terminal device 300-1. Also, for example, the control unit 155 of the control entity 400-1 triggers the switching. More specifically, for example, the control unit 155 of the control entity 400-1 instructs the small base station 200-1 to perform the switching via the macro base station 100-1 or directly.

(Flow of Process)

In the communication control process according to the second modification of the first embodiment, for example, the control entity 400-1 requests the macro base station 100-1 and the small base station 200-1 to provide a result of measurement by the terminal device 300-1. Also, the control entity 400-1 acquires a result of measurement by the terminal device 300-1 in the end. Then, instead of the macro base station 100-1, the control entity 400-1 determines switching of the operation mode of the small base station 200-1 and instructs the small base station 200-1 to perform the switching via the macro base station 100-1 or directly. Excluding these points, the communication control process according to the second modification is just as described with reference to FIGS. 11 to 14.

In the foregoing, the second modification of the first embodiment has been described. In the second modification, an example in which the control entity 400-1 includes the requesting unit 151 is described, but the second modification is not limited to such an example. For example, the requesting unit 151 may be included in, instead of the control entity 400-1, the macro base station 100-1 or the small base station 200-1.

<2.7. Third Modification>

Next, the third modification of the first embodiment will be described with reference to FIG. 15.

In the first embodiment, for example, as described above, the macro base station 100-1 includes the requesting unit 151, the information acquisition unit 153, and the control unit 155.

In the third modification of the first embodiment, on the other hand, instead of the macro base station 100-1, the small base station 200-1 includes the information acquisition unit 153 and the control unit 155. Also in the third modification, for example, instead of the macro base station 100-1, the small base station 200-1 further includes the requesting unit 151.

(Small Base Station 200-1: Requesting Unit 151)

In the third modification, for example, the small base station 200-1 includes the requesting unit 151. In this case, the requesting unit 151 of the small base station 200-1 requests, for example, the terminal device 300-1 connected to the small base station 200-1 to report a result of measurement. Then, the terminal devices 300-1 reports a result of measurement to the small base station 200-1.

(Small Base Station 200-1: Information Acquisition Unit 153)

In the third modification, the small base station 200-1 includes the information acquisition unit 153. In this case, for example, a result of measurement by the terminal device 300-1 connected to the small base station 200-1 is reported to the small base station 200-1 by the terminal device 300-1 and stored in the small base station 200-1. Then, the information acquisition unit 153 of the small base station 200-1 acquires the result of the measurement by the terminal device 300-1 connected to the small base station 200-1.

(Small Base Station 200-1: Control Unit 155)

In the third modification, the small base station 200-1 includes the control unit 155. In this case, for example, the control unit 155 of the small base station 200-1 determines to perform switching of the operation mode of the small base station 200-1 based on the result of the measurement by the terminal device 300-1. Also, for example, the control unit 155 of the small base station 200-1 triggers the switching. More specifically, for example, the control unit 155 of the small base station 200-1 instructs the function to switch the operation mode of the small base station 200-1 to perform the switching. As a result, the function performs the switching.

In the third modification, for example, the switching is switching (that is, the first switching) from the first mode (for example, the normal mode) to the second mode (for example, the stop mode or the power saving mode).

(Flow of Process: First Switching)

FIG. 15 is a sequence diagram showing an example of the schematic flow of the communication control process according to the third modification of the first embodiment. The example is an example of the communication control process for the first switching (that is, switching from the first mode to the second mode).

The small base station 200-1 requests each of the terminal devices 300-1 connected to the small base station 200-1 to report a result of measurement (S581). Then, each of the terminal devices 300-1 connected to the small base station 200-1 reports a result of measurement to the small base station 200-1 (S583).

And then, for example, the small base station 200-1 determines to perform the first switching of the small base station 200-1 based on a result of measurement by each of the terminal devices 300-1 connected to the small base station 200-1 (S585).

The small base station 200-1 also determines the handover destination of each of the terminal devices 300-1 based on a result of measurement by each of the terminal devices 300-1 connected to the small base station 200-1 (S587). Then, a handover procedure is performed (S589).

Thereafter, the small base station 200-1 switches the operation mode from the first mode (for example, the normal mode) to the second mode (for example, the stop mode or the power saving mode) (S591).

In the foregoing, the third modification of the first embodiment has been described. In the third modification, an example in which the small base station 200-1 includes the requesting unit 151 is described, but the second modification is not limited to such an example. For example, the requesting unit 151 may be included in, instead of the small base station 200-1, the macro base station 100-1 or the control entity 400-1.

In the foregoing, the first embodiment has been described. In the first embodiment, as is described, switching of the operation mode of the small base station 200-1 is controlled based on a result of measurement by the terminal device 300-1. In the first embodiment, in addition to the result of the measurement, the control may be exercised further based on other information. For example, in addition to the result of the measurement, the control may be exercised further based on communication conditions (for example, traffic or the number of connected terminals) in the macro cell 10. As an example, the operation mode of the small base station 200-1 may be switched to the second mode (the stop mode or the power saving mode) only if the necessity of offloading is low (for example, traffic of the macro cell 10 is light, the number of terminals connected to the macro cell 10 is small or the like). As another example, the operation mode of the small base station 200-1 may be switched to the first mode (the normal mode) only if the necessity of offloading is high (for example, traffic of the macro cell 10 is heavy, the number of terminals connected to the macro cell 10 is large or the like).

<<3. Second Embodiment>>

Subsequently, the second embodiment in the present disclosure will be described with reference to FIGS. 16 to 19.

According to the second embodiment of the present disclosure, before the operation mode of the small base station 200 being switched from the first mode to the second mode, reporting or offering of a result of measurement by the terminal device 300 connected to the small base station 200 is requested. The first mode is a mode in which the small base station 200 can perform wireless communication with a device inside the small cell 20 and the second mode is a mode that consumes less power than the first mode.

Also according to the second embodiment of the present disclosure, before the operation mode being switched from the first mode to the second mode, a result of measurement by the terminal device 300 connected to the small base station 200 is acquired and the handover destination of the terminal device 300 is determined based on the result of the measurement.

Accordingly, for example, the small base station 200 can flexibly be operated in accordance with conditions. As a result, power consumption of the small base station 200 can further be reduced.

<3.1. Configuration of Macro Base Station>

First, an example of the configuration of a macro base station 100-2 according to the second embodiment will be described with reference to FIG. 16. FIG. 16 is a block diagram showing an example of the configuration of the macro base station 100-2 according to the second embodiment. Referring to FIG. 16, the macro base station 100-2 includes the antenna unit 110, the wireless communication unit 120, the network communication unit 130, the storage unit 140, and a processing unit 160.

Concerning the antenna unit 110, the wireless communication unit 120, the network communication unit 130, and the storage unit 140, there is no particular difference between the first embodiment and the second embodiment. Thus, only the processing unit 160 will be described here.

(Processing Unit 160)

The processing unit 160 provides various functions of the macro base station 100-2. The processing unit 160 includes a switching recognition unit 161, a requesting unit 163, an information acquisition unit 165, and a control unit 167.

(Switching Recognition Unit 161)

The switching recognition unit 161 recognizes that the operation mode of a small base station 200-2 is switched from the first mode to the second mode in advance.

The First Mode and Second Mode

The first mode is a mode in which the small base station 200-2 can perform wireless communication with a device inside the small cell 20. The first mode is, for example, a normal mode in which the small base station 200-2 performs normal wireless communication.

On the other hand, the second mode is a mode that consumes less power than the first mode. The second mode is, for example, a mode in which a signal processing circuit continuously or discontinuously stops for at least the wireless communication. The signal processing circuit contains at least one of, for example, a signal processing circuit to process a radio frequency (RF) signal, a signal processing circuit to process to process a base band signal, and a signal processing circuit of a still upper layer. In other words, the second mode is a mode in which the small base station 200-2 does not perform wireless communication continuously or discontinuously. The second mode is, for example, a stop mode in which the signal processing circuit continuously stops or a power saving mode in which the signal processing circuit discontinuously stops.

Based on the above, for example, the switching recognition unit 161 recognizes that the small base station 200-2 is switched from the normal mode to the stop mode (or the power saving mode) in advance.

Technique of Recognition

For example, the macro base station 100-2 (processing unit 160) determines to perform switching of the operation mode from the first mode to the second mode. Then, the switching recognition unit 161 recognizes that the operation mode is switched from the first mode to the second mode in advance.

Instead of the macro base station 100-2, another node (for example, a control entity 400-2) may determine the switching. In this case, the other mode notifies the macro base station 100-2 of the switching or instructs the macro base station 100-2 to perform the switching and the switching recognition unit 161 may thereby recognize that the operation mode is switched from the first mode to the second mode.

(Requesting Unit 163)

Before the operation mode of a small base station 200-2 being switched from the first mode to the second mode, the requesting unit 163 requests reporting or offering of a result of measurement by a terminal device 300-2 connected to the small base station 200-2.

Measurement

For example, the communication system 1 is a system according to LTE. In this case, the measurement includes measurement of RSRP. The measurement may also include RSRQ. The measurement may also include measurement of SINR and/or CQI.

As another example, the communication system 1 may a system according to UMTS. In this case, the measurement may include measurement of, for example, RSCP as received intensity of a pilot signal. The measurement may also include measurement of Ec/No, SINR, and/or CQI.

As still another example, the communication system 1 may a system according to EV-DO. In this case, the measurement may include measurement of RSCP or Ec/Io. The measurement may also include measurement of SINR and/or DRC.

However, the measurement is not limited to the aforementioned first to third examples. The measurement may naturally be measurement of other measuring items. As an example, the measurement may be measurement of indexes equivalent to measuring items according to the aforementioned first to third examples.

Request

Technique of Request

For example, the requesting unit 163 requests the small base station 200-2 to provide a result of measurement by the terminal device 300-2 connected to the small base station 200-2 via the network communication unit 130. Then, the small base station 200-2 requests the one or more terminal devices 300-2, which is connected to the small base station 200-2 itself, to report a result of measurement and the one or more terminal devices 300-2 report a result of measurement to the small base station 200-2. Then, the small base station 200-2 provides the result of the measurement to the macro base station 100-2. Thereafter, the result of the measurement is stored in the storage unit 140.

More specifically, for example, the requesting unit 163 requests each of the small base stations 200-2 to provide a result of measurement by each of the terminal devices 300-2 connected to the small base station 200-2 via the network communication unit 130. As a result, each of the base stations 200-2 provides a result of measurement by each of the terminal devices 300-2 connected to the small base station 200-2 itself to the macro base station 100-2. A result of measurement by each of the terminal devices 300-2 may contain a result of measurement by the macro base station 100-2 and/or a result of measurement by the small base station 200-2 other than the small base station 200-2 to which the terminal device 300-2 is connected.

A request to the terminal 300-2 by the small base station 200-2 is made by transmitting, for example, an RRC connection reconfiguration message to the terminal device 300-2.

Content of Request

When requesting offering or reporting of a result of measurement by the terminal device 300-2, the requesting unit 163 specifies measurement objects, measuring items, and/or reporting techniques.

The measurement objects are, for example, cells or base stations. For example, a result of measurement intended for reporting or offering include a result of measurement of one or more cells other than the small cell 20 of the small base station 200-2 whose operation mode is switched from the first mode to the second mode. Specifically, for example, the other cell is the macro cell 10 and/or the one or more other small cells 20. In this case, measurement objects include the macro cell 10 and/or the one or more other small cells 20 (or base stations thereof). When such other cells become measurement objects, an appropriate handover destination (a base station or a cell) for handover between base stations can be found. Thus, for example, the whole small base station 200-2 can be stopped or caused to operate in power saving mode. As a result, power consumption can significantly be reduced.

The measuring items include, for example, RSRP.

The reporting technique is, for example, periodic reporting or event-triggered reporting. According to the periodic reporting, a result of measurement is reported in periodic timing and according to the event-triggered reporting, a result of measurement is reported in timing of an event occurrence. For example, to collect results of measurement by all the terminal devices 300-2 connected to the small base station 200-2 whose operation mode is switched from the first mode to the second mode within a predetermined interval, it is desirable to provide periodic reporting. Thus, as the reporting technique, for example, the periodic reporting is specified. In this case, for example, the measuring interval is further specified. Then, a result of measurement in the measuring interval is reported by the terminal device 300-2. Alternatively, a reporting period may further be specified so that measurement and reporting are done in the reporting period. Alternatively, a reporting interval may be specified so that measurement and reporting are done in the reporting period during the reporting interval.

Incidentally, for example, the aforementioned RRC connection reconfiguration message contains measurement objects, measuring items and/or reporting techniques. Accordingly, measurement objects, measuring items and/or reporting techniques are specified.

For example, as described above, the requesting unit 163 requests reporting or offering of a result of measurement by the terminal device 300-2. Accordingly, for example, a small base station can flexibly be operated in accordance with conditions.

More specifically, for example, even when handover is normally not necessary, a result of measurement by the terminal device 300 can be obtained in accordance with necessity on the network side. Thus, for example, it becomes possible to determine an appropriate handover destination of the terminal device 300-2 connected to the small base station 200-2 attempted to stop or operate in power saving mode. Thus, even if any one of the terminal devices 300-2 is connected to the small base station 200-2, communication of the terminal device 300-2 can be continued. Therefore, regardless of whether or not the terminal device 300-2 is connected to the small base station 200-2, the small base station 200-2 can be stopped or operated in power saving mode.

(Information Acquisition Unit 165)

Before the operation mode of the small base station 200-2 being switched from the first mode to the second mode, the information acquisition unit 165 acquires a result of measurement by the terminal device 300-2 connected to the small base station 200-2.

For example, as described above, a result of measurement by the terminal device 300-2 connected to the small base station 200-2 is provided to the macro base station 100-2 in response to a request from the requesting unit 163 and stored in the storage unit 140. Then, the information acquisition unit 165 acquires the result of the measurement stored in the storage unit 140.

For example, the result of the measurement includes a result of measurement of one or more other cells than the small cell 20 of the small base station 200-2. More specifically, for example, the other cell is the macro cell 10 and/or the one or more other small cells 20.

(Control Unit 167)

The control unit 167 determines the handover destination of the terminal device 300-2 based on the result of the measurement. That is, the control unit 167 determines the handover destination of the terminal device 300-2 based on the result of the measurement by the terminal device 300-2 connected to the small base station 200-2 whose operation mode is switched from the first mode to the second mode.

Specifically, for example, the control unit 167 determines a base station other than the small base station 200-2 as the handover destination based on the result of the measurement. For example, the control unit 167 determines the macro base station 100-2 (or the macro cell 10) or the other small base station 200-2 (or the other small cell 20) as the handover destination. As an example, the control unit 167 determines the base station (or the cell) corresponding to the largest RSRP of RSRP measured by the terminal device 300-2 as the handover destination of the terminal device 300-2.

Accordingly, for example, the small base station 200-2 can flexibly be operated in accordance with conditions. More specifically, for example, even if any one of the terminal devices 300-2 is connected to the small base station 200-2, communication of the terminal device 300-2 can be continued. Therefore, regardless of whether or not the terminal device 300-2 is connected to the small base station 200-2, the small base station 200-2 can be stopped or operated in power saving mode.

In addition, with another base station (or another cell) being determined as the handover destination, for example, the whole small base station 200 can be stopped or operated in power saving mode. As a result, power consumption can significantly be reduced.

<3.2. Flow of Process>

Next, an example of the communication control process according to the second embodiment will be described with reference to FIG. 17. FIG. 17 is a sequence diagram showing an example of the schematic flow of the communication control process according to the second embodiment.

The macro base station 100-2 determines to perform switching of the operation mode of the small base station 200-2 from the first mode (for example, the normal mode) to the second mode (for example, the stop mode or the power saving mode) (S601).

Then, the macro base station 100-2 requests the small base station 200-2 to provide a result of measurement by each of the terminal devices 300-2 connected to the small base station 200-2 (S603). And then, the small base station 200-2 requests each of the terminal devices 300-2 connected to the small base station to report a result of measurement (S605). Then, each of the terminal devices 300-2 reports a result of measurement to the small base station 200-2 (S607). Thereafter, the small base station 200-2 provides the result of the measurement to the macro base station 100-2 (S609).

Thereafter, the macro base station 100-2 determines the handover destination of each of the terminal devices 300-2 connected to the small base station 200-2 based on a result of measurement by each of the terminal devices 300-2 connected to the small base station 200-2 (S611). Then, a handover procedure is performed (S613).

Then, the macro base station 100-2 instructs the small base station 200-2 to switch the operation mode from the first mode to the second mode (S615). Then, the small base station 200-2 switches the operation mode from the first mode (for example, the normal mode) to the second mode (for example, the stop mode or the power saving mode) (S617).

<3.3. First Modification>

Next, a first modification of the second embodiment will be described. In the first modification of the second embodiment, carrier aggregation is supported. Then, the operation mode of the small base station 200-2 can be switched in units of frequency bands. A result of measurement by the terminal device 300-2 includes a result of measurement in one or more other frequency bands than the frequency band in which the operation mode is switched. Then, the other frequency band than the frequency band in which the operation mode is switched can be determined as a handover destination based on the result of the measurement. The frequency band is, for example, a component carrier (CC).

(Macro Base Station 100-2: Requesting Unit 163)

Request

Content of Request

In the first modification, measurement objects are, for example, frequency bands (for example, CC) for each cell (or each base station). For example, a result of measurement intended for reporting or offering includes a result of measurement in one or more other frequency bands (for example, one or more CC) than the frequency band (for example, CC) in which the operation mode is switched. In this case, measurement objects include, for example, among one or more frequency bands used by the small base station 200-2 whose operation mode is switched, one or more other frequency bands than the frequency band in which the operation mode is switched. When such other frequency bands (for example, CC) become measurement bands, an appropriate handover destination (frequency band) in handover between frequencies can be found. Thus, for example, while stopping the operation or operating in power saving mode in a portion of frequency bands, the small base station 200-2 can continue communication with the terminal band 300-2 in another frequency band. Therefore, power consumption can be reduced while offloading in progress.

(Macro Base Station 100-2: Information Acquisition Unit 165)

In the first modification, the result of the measurement to be acquired includes a result of measurement in one or more other frequency bands (for example, one or more other CC) than the frequency band (for example, CC) in which the operation mode is switched. For example, the result of the measurement to be acquired includes, among one or more frequency bands (for example, CC) used by the small base station 200-2 whose operation mode is switched, one or more other frequency bands (for example, one or more other CC) than the frequency band in which the operation mode is switched.

(Macro Base Station 100-2: Control Unit 167)

In the first modification, for example, the control unit 167 determines a frequency band other than the frequency band (for example, CC) in which the operation mode is switched as the handover destination based on the result of the measurement.

For example, the control unit 167 determines the frequency band (for example, CC) corresponding to the largest RSRP of RSRP measured by the terminal device 300-2 as the handover destination of the terminal device 300-2. For example, among one or more frequency bands (for example, CC) used by the small base station 200-2 whose operation mode is switched, one frequency band (for example, one CC) other than the frequency band in which the frequency band is switched as the handover destination. That is, handover between frequencies may occur.

Naturally, a frequency band (for example, CC) used by the other small base station 200-2 than the small base station 200-2 whose operation mode is switched may be determined as the handover destination. That is, handover between base stations may occur.

Accordingly, for example, while stopping the operation or operating in power saving mode in a portion of frequency bands, the small base station 200-2 can continue communication with the terminal band 300-2 in another frequency band. Therefore, power consumption can be reduced while offloading in progress.

(Flow of Process)

The flow of the communication control process according to the first modification of the second embodiment is the same as, for example, the one example of the flow of the communication control process according to the second embodiment described with reference to FIG. 17 except that measurement objects and handover destinations are different.

<3.4. Second Modification>

Next, the second modification of the second embodiment will be described with reference to FIG. 18.

In the second embodiment, as described above, control signals and data signals are transmitted and received in, for example, the small cell 20. That is, the small cell 20 transmits and receives both of control plane signals (control signals) and user plane signals (data signals)

In the second modification of the second embodiment, on the other hand, only data signals are transmitted and received in the small cell 20 and control signals are not transmitted and received. Thus, control signals relating to the small cell 20 are transmitted and received by the macro base station 100-2.

In the second modification, for example, carrier aggregation is supported and the terminal device 300-2 communicates with the macro base station 100-2 using PCC and communicates with the small base station 200-2 using SCC. That is, the terminal device 300-2 is connected to the small base station 200-2 via SCC while being connected to the macro base station 100-2 via PCC.

(Macro Base Station 100-1: Requesting Unit 163)

Request

Technique of Request

In the second modification of the second embodiment, the requesting unit 163 requests the one or more terminal devices 300-2 connected to the small base station 200-2 whose operation mode is switched from the first mode to the second mode to report a result of measurement via the wireless communication unit 120. Then, the one or more terminal devices 300-2 report a result of measurement to the macro base station 100-2. Thereafter, the result of the measurement is stored in the storage unit 140.

More specifically, for example, the requesting unit 163 requests each of the terminal devices 300-2 connected to the small base station 200-2 to report a result of measurement via the wireless communication unit 120. As a result, each of the terminal devices 300-2 reports a result of measurement to the macro base station 100-2.

A request to the terminal 300-2 by the macro base station 100-2 is made by transmitting, for example, an RRC connection reconfiguration message to the terminal device 300-2.

(Flow of Process)

FIG. 18 is a sequence diagram showing an example of the schematic flow of the communication control process according to the second modification of the second embodiment.

The macro base station 100-2 determines to perform switching of the operation mode of the small base station 200-2 from the first mode (for example, the normal mode) to the second mode (for example, the stop mode or the power saving mode) (S621).

Then, the macro base station 100-2 requests each of the terminal devices 300-2 connected to the small base station 200-2 to report a result of measurement (S623). And then, each of the terminal devices 300-2 reports a result of measurement to the macro base station 100-2 (S625).

Thereafter, the macro base station 100-2 determines the handover destination of each of the terminal devices 300-2 connected to the small base station 200-2 based on a result of measurement by each of the terminal devices 300-2 connected to the small base station 200-2 (S627). Then, a handover procedure is performed (S629). The handover here is, for example, handover of SCC based on a combination of addition and deletion of SCC. That is, the handover is handover of SCC based on a combination of deletion of SCC in use and addition of SCC at the handover destination. SCC at the handover destination may be CC of the other small base station 200-2 (the small base station 200-2 other than the small base station 200-2 whose operation mode is switched) or other CC of the same small base station 200-2 (the small base station 200-2 whose operation mode is switched).

Then, the macro base station 100-2 instructs the small base station 200-2 to switch the operation mode from the first mode to the second mode (S631). Then, the small base station 200-2 switches the operation mode from the first mode (for example, the normal mode) to the second mode (for example, the stop mode or the power saving mode) (S633).

<3.5. Third Modification>

Next, the third modification of the second embodiment will be described with reference to FIG. 19.

In the second embodiment, for example, as described above, the macro base station 100-2 includes the switching recognition unit 161, the requesting unit 163, the information acquisition unit 165, and the control unit 167.

In the third modification of the second embodiment, on the other hand, for example, instead of the macro base station 100-2, the control entity 400-2 includes the switching recognition unit 161 and the requesting unit 163. Also, for example, instead of the macro base station 100-2, the control entity 400-2 includes the information acquisition unit 165 and the control unit 167.

(Control Entity 400-2: Switching Recognition Unit 161)

In the third modification, for example, the control entity 400-2 includes the switching recognition unit 161. In this case, for example, the control entity 400-2 determines to perform switching of the operation mode from the first mode to the second mode. Then, the switching recognition unit 161 of the control entity 400-2 recognizes that the operation mode is switched from the first mode to the second mode in advance. Instead of the control entity 400-2, another node may determine to perform the switching and notify the control entity 400-2 of the switching or instruct the control entity 400-2 to perform the switching.

(Control Entity 400-2: Rquesting Unit 163)

In the third modification, for example, the control entity 400-2 includes the requesting unit 163. In this case, the requesting unit 163 of the control entity 400-2 requests, for example, the small base station 200-2 whose operation mode is switched from the first mode to the second mode to provide a result of measurement by the terminal device 300-2 connected to the small base station 200-2. Alternatively, the requesting unit 163 of the control entity 400-2 may request the macro base station 100-2 to provide a result of measurement by the terminal device 300-2 connected to the small base station 200-2 and in which case, the macro base station 100-2 further requests the small base station 200-2 to provide the result of the measurement.

(Control Entity 400-2: Information Acquisition Unit 165)

In the third modification, the control entity 400-2 includes the information acquisition unit 165. In this case, a result of measurement by the terminal device 300-2 is provided to the control entity 400-2 by the macro base station 100-2 or the small base station 200-2 and stored in the control entity 400-2. Then, the information acquisition unit 165 of the control entity 400-2 acquires the result of the measurement by the terminal device 300-2.

(Control Entity 400-2: Control Unit 167)

In the third modification, the control entity 400-2 includes the control unit 167. In this case, for example, the control unit 167 of the control entity 400-2 determines the handover destination of the terminal device 300-2 based on the result of the measurement by the terminal device 300-2.

(Flow of Process)

FIG. 19 is a sequence diagram showing an example of the schematic flow of the communication control process according to the third modification of the second embodiment.

The control entity 400-2 determines to perform switching of the operation mode of the small base station 200-2 from the first mode (for example, the normal mode) to the second mode (for example, the stop mode or the power saving mode) (S641).

Then, the control entity 400-2 requests the small base station 200-2 to provide a result of measurement by each of the terminal devices 300-2 connected to the small base station 200-2 (S643). Then, the small base station 200-2 requests each of the terminal devices 300-2 connected to the small base station to report a result of measurement (S645). Then, each of the terminal devices 300-2 reports a result of measurement to the small base station 200-2 (S647). Thereafter, the small base station 200-2 provides the result of the measurement to the control entity 400-2 (S649).

Thereafter, the control entity 400-2 determines the handover destination of each of the terminal devices 300-2 connected to the small base station 200-2 based on a result of measurement by each of the terminal devices 300-2 connected to the small base station 200-2 (S651). Then, a handover procedure is performed (S653).

Then, the control entity 400-2 instructs the small base station 200-2 to switch the operation mode from the first mode to the second mode (S655). Then, the small base station 200-2 switches the operation mode from the first mode (for example, the normal mode) to the second mode (for example, the stop mode or the power saving mode) (S657).

<3.6. Fourth Modification>

Next, the fourth modification of the second embodiment will be described with reference to FIG. 20.

In the second embodiment, for example, as described above, the macro base station 100-2 includes the switching recognition unit 161, the requesting unit 163, the information acquisition unit 165, and the control unit 167.

In the fourth modification of the second embodiment, on the other hand, for example, instead of the macro base station 100-2, the small base station 200-2 includes the switching recognition unit 161 and the requesting unit 163. Also, for example, instead of the macro base station 100-2, the small base station 200-2 includes the information acquisition unit 165 and the control unit 167.

(Small Base Station 200-2: Switching Recognition Unit 161)

In the fourth modification, for example, the small base station 200-2 includes the switching recognition unit 161. In this case, for example, the macro base station 100-2 (or another node) determines to perform switching of the operation mode of the small base station 200-2 from the first mode to the second mode. Then, the macro base station 100-2 (or another node) instructs the small base station 200-2 to perform the switching and the switching recognition unit 161 of the small base station 200-2 recognizes that the operation mode is switched from the first mode to the second mode in advance. Incidentally, the small base station 200-2 itself may determine to perform the switching.

(Small Base Station 200-2: Requesting Unit 163)

In the fourth modification, for example, the small base station 200-2 includes the requesting unit 163. In this case, the requesting unit 163 of the small base station 200-2 requests reporting of a result of measurement by the terminal device 300-2 connected to the small base station.

(Small Base Station 200-2: Information Acquisition Unit 165)

In the fourth modification, the small base station 200-2 includes the information acquisition unit 165. In this case, a result of measurement by the terminal device 300-2 connected to the small base station 200-2 is provided to the small base station 200-2 and stored in the small base station 200-2. Then, the information acquisition unit 165 of the small base station 200-2 acquires the result of the measurement by the terminal device 300-2 connected to the small base station 200-2.

(Small Base Station 200-2: Control Unit 167)

In the fourth modification, the small base station 200-2 includes the control unit 167. In this case, for example, the control unit 167 of the small base station 200-2 determines the handover destination of the terminal device 300-2 based on the result of the measurement by the terminal device 300-2 connected to the small base station 200-2.

(Flow of Process)

FIG. 20 is a sequence diagram showing an example of the schematic flow of the communication control process according to the fourth modification of the second embodiment.

The macro base station 100-2 determines to perform switching of the operation mode of the small base station 200-2 from the first mode (for example, the normal mode) to the second mode (for example, the stop mode or the power saving mode) (S671). Then, the macro base station 100-2 instructs the small base station 200-2 to switch the operation mode from the first mode to the second mode (S673).

And then, the small base station 200-2 requests each of the terminal devices 300-2 connected to the small base station to report a result of measurement (S675). Then, each of the terminal devices 300-2 reports a result of measurement to the small base station 200-2 (S677).

Thereafter, the control entity 400-2 determines the handover destination of each of the terminal devices 300-2 connected to the small base station 200-2 based on a result of measurement by each of the terminal devices 300-2 connected to the small base station 200-2 (S679). Then, a handover procedure is performed (S681).

Then, the small base station 200-2 switches the operation mode from the first mode (for example, the normal mode) to the second mode (for example, the stop mode or the power saving mode) (S683).

<<4. Application Example>>

Technology according to the present disclosure can be applied to various products. For example, the macro base station 100 and the small base station 200 may be realized as any type of eNB (evolved Node B). Specifically, the macro base station 100 may be realized as macro eNB and the small base station 200 may be realized as small eNB. The small eNB may be eNB covering a cell smaller than a macro cell such as pico eNB, micro eNB, or home (femto) eNB. Instead, the macro base station 100 and the small base station 200 may be realized as other types of base stations such as NodeB or base transceiver station (BTS). The macro base station 100 and the small base station 200 may include a body (also called a base station device) controlling wireless communication and one or more remote radio head (RRH) arranged in another place separately from the body. Also, various types of terminals described later may operate as the macro base station 100 or the small base station 200 by executing a base station function temporarily or semi-permanently.

Also, for example, the control entity 400 may be realized as some type of server such as a tower server, a rack server, or a blade server. The control entity 400 may be a control module (for example, an integrated circuit module constituted of one die or a card or blade inserted into the slot of a blade server) mounted on a server. The control entity 400 may be configured in a form dynamically implemented or non-implemented on the server by software. Further, the control entity 400 may be implemented on a server arranged in a core network including base stations and in which any function is implemented.

<4.1. Application Examples Concerning Base Station>

(First Application Example)

FIG. 21 is a block diagram showing a first example of the schematic configuration of eNB to which technology according to the present disclosure can be applied. eNB 800 includes one or more antennas 810 and a base station device 820. Each of the antennas 810 and the base station device 820 can mutually be connected via an RF cable.

Each of the antennas 810 has a single or a plurality of antenna elements (for example, a plurality of antenna elements constituting a MIMO antenna) and is used to transmit and receive a radio signal by the base station device 820. The eNB 800 may have, as shown in FIG. 21, a plurality of the antennas 810 and, for example, the plurality of antennas 810 may correspond to a plurality of frequency bands used by the eNB 800 respectively. FIG. 21 shows an example in which the eNB 800 has the plurality of antennas 810, but the eNB 800 may have the single antenna 810.

The base station device 820 includes a controller 821, a memory 822, a network interface 823, and a wireless communication interface 825.

The controller 821 may be, for example, a CPU or DSP and causes various functions of an upper layer of the base station device 820 to operate. For example, the controller 821 generates data packets from data inside a signal processed by the wireless communication interface 825 and transfers the generated packets via the network interface 823. The controller 821 may generate a bundled packet by bundling data from a plurality of base band processors and transfer the generated bundled packet. The controller 821 may also have a logical function to perform control such as the radio resource control, radio bearer control, mobility management, admission control, and scheduling. The control may be performed in cooperation with surrounding eNB or a core network. The memory 822 includes a RAM and a ROM and stores programs executed by the controller 821 and various kinds of control data (for example, a terminal list, transmission power data, and scheduling data).

The network interface 823 is a communication interface to connect the base station device 820 to the core network 824. The controller 821 may communicate with a core network node or other eNB via the network interface 823. In this case, the eNB 800 and a core network node or other eNB may mutually be connected through a logical interface (for example, an S1 interface or X2 interface). The network interface 823 may be a wire communication interface or a wireless communication interface for wireless backhaul. When the network interface 823 is a wireless communication interface, the network interface 823 may use a higher frequency band than a frequency band used by the wireless communication interface 825 for wireless communication.

The wireless communication interface 825 supports one of cellular communication modes such as LTE (Long Term Evolution) or LTE-Advanced and provides a wireless connection to a terminal positioned inside a cell of the eNB 800 via the antenna 810. The wireless communication interface 825 can typically include a base band (BB) processor 826 and an RF circuit 827. The BB processor 826 may perform, for example, encoding/decoding, modulation/demodulation, multiplexing/demultiplexing and performs various signal processes each layer (for example, L1, medium access control (MAC), radio link control (RLC) and packet data convergence protocol (PDCP)). The BB processor 826 may have, instead of the controller 821, a portion or all of the above logical functions. The BB processor 826 may be a module including a memory storing a communication control program, a processor to execute the program, and related circuits and the function of the BB processor 826 may be changeable by updating the program. The module may be a card or blade inserted into a slot of the base station device 820 or a chip mounted on the card or the blade. On the other hand, the RF circuit 827 may include a mixer, a filter, an amplifier or the like and transmits and receives a radio signal via the antenna 810.

The wireless communication interface 825 may include, as shown in FIG. 21, a plurality of the BB processors 826 and the plurality of BB processors 826 may correspond, for example, to a plurality of frequency bands used by the eNB 800 respectively. The wireless communication interface 825 also may include, as shown in FIG. 21, a plurality of the RF circuits 827 and the plurality of RF circuits 827 may correspond, for example, to a plurality of antenna elements respectively. FIG. 21 shows an example in which the wireless communication interface 825 includes the plurality of BB processors 826 and the plurality of RF circuits 827, but the wireless communication interface 825 may include the single BB processor 826 and the single RF circuit 827.

(Second Application Example)

FIG. 22 is a block diagram showing a second example of the schematic configuration of eNB to which technology according to the present disclosure can be applied. eNB 830 includes one or more antennas 840, a base station device 850, and RRH 860. Each of the antennas 840 and the RRH 860 can mutually be connected via an RF cable. Also, the base station device 850 and the RRH 860 can mutually be connected by a high-speed line such as an optical fiber cable.

Each of the antennas 840 has a single or a plurality of antenna elements (for example, a plurality of antenna elements constituting a MIMO antenna) and is used to transmit and receive a radio signal by the RRH 860. The eNB 830 may have, as shown in FIG. 22, a plurality of the antennas 840 and, for example, the plurality of antennas 840 may correspond to a plurality of frequency bands used by the eNB 830 respectively. FIG. 22 shows an example in which the eNB 830 has the plurality of antennas 840, but the eNB 830 may have the single antenna 840.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 21.

The wireless communication interface 855 supports one of cellular communication modes such as LTE or LTE-Advanced and provides a wireless connection to a terminal positioned inside a sector corresponding to the RRH 860 via the RRH 860 and the antenna 840. The wireless communication interface 855 can typically include a BB processor 856. The BB processor 856 is the same as the BB processor 826 described with reference to FIG. 21 except that the BB processor 856 is connected to an RF circuit 864 of the RRH 860 via the connection interface 857. The wireless communication interface 855 may include, as shown in FIG. 22, a plurality of the BB processors 856 and the plurality of BB processors 856 may correspond, for example, to a plurality of frequency bands used by the eNB 830 respectively. FIG. 22 shows an example in which the wireless communication interface 855 includes the plurality of BB processors 856, but the wireless communication interface 855 may include the single BB processor 856.

The connection interface 857 is an interface to connect the base station device 850 (wireless communication interface 855) to the RRH 860. The connection interface 857 may be a communication module for communication on the high-speed line connecting the base station device 850 (wireless communication interface 855) and the RRH 860.

The RRH 860 includes a connection interface 861 and a wireless communication interface 863.

The connection interface 861 is an interface to connect the RRH 860 (wireless communication interface 863) to the base station device 850. The connection interface 861 may be a communication module for communication on the high-speed line.

The wireless communication interface 863 transmits and receives a radio signal via the antenna 840. The wireless communication interface 863 can typically include the RF circuit 864. The RF circuit 864 may include a mixer, a filter, an amplifier or the like and transmits and receives a radio signal via the antenna 840. The wireless communication interface 863 may include, as shown in FIG. 22, a plurality of the RF circuits 864 and the plurality of RF circuits 864 may correspond, for example, to a plurality of antenna elements respectively. FIG. 22 shows an example in which the wireless communication interface 863 includes the plurality of RF circuits 864, but the wireless communication interface 863 may include the single RF circuit 864.

In the eNB 800 and the eNB 830 shown in FIGS. 21 and 22 respectively, the requesting unit 151, the information acquisition unit 153, and the control unit 155 described with reference to FIG. 2 may be implemented in the wireless communication interface 825, the wireless communication interface 855, and/or the wireless communication interface 863. Also, at least a portion of these functions may be implemented in the controller 821 and the controller 851.

Also in the eNB 800 and the eNB 830 shown in FIGS. 21 and 22 respectively, the switching recognition unit 161, the requesting unit 163, the information acquisition unit 165, and the control unit 167 described with reference to FIG. 16 may be implemented in the wireless communication interface 825, the wireless communication interface 855, and/or the wireless communication interface 863. Also, at least a portion of these functions may be implemented in the controller 821 and the controller 851.

<4.2. Application Example Concerning Control Entity>

FIG. 23 is a block diagram showing an example of the schematic configuration of a server 900 to which technology according to the present disclosure can be applied. The server 900 includes a processor 901, a memory 902, a storage unit 903, a network interface 904, and a bus 906.

The processor 901 is, for example, a central processing unit (CPU) or digital signal processor (DSP) and controls various functions of the server 900. The memory 902 includes a random access memory (RAM) and a read only memory (ROM) and stores programs executed by the processor 901 and data. The storage unit 903 can include a storage medium such as a semiconductor memory or a hard disk.

The network interface 904 is a wire communication interface to connect the server 900 to a wire communication network 905. The wire communication network 905 may be a core network such as evolved packet core (EPC) or packet data network (PDN) such as the Internet.

The bus 906 mutually connects the processor 901, the memory 902, the storage unit 903, and the network interface 904. The bus 906 may include two or more buses of different speeds (for example, a high-speed bus and a low-speed bus).

In the server 900 shown in FIG. 23, the requesting unit 151, the information acquisition unit 153, and the control unit 155 described with reference to FIG. 2 may be implemented in the processor 901.

Also in the server 900 shown in FIG. 23, the switching recognition unit 161, the requesting unit 163, the information acquisition unit 165, and the control unit 167 described with reference to FIG. 16 may be implemented in the processor 901.

<<<5. Summary>>

Heretofore, each node and each process according to the embodiments of the present disclosure have been described with reference to FIGS. 1 to 23.

(First Embodiment)

According to the first embodiment of the present disclosure, a result of measurement by the terminal device 300-1 is acquired and switching of the operation mode of the small base station 200-1 in the small cell 20 is controlled based on the result of the measurement. The switching is switching of the operation mode from one of the first mode and the second mode to the other. The first mode is a mode (for example, the normal mode) in which the small base station 200-1 can perform wireless communication with a device inside the small cell 20 and the second mode is a mode (for example, the stop mode or the power saving mode) that consumes less power than the first mode.

Accordingly, for example, the small base station 200-1 can flexibly be operated in accordance with conditions.

Switching of the Operation Mode from the First Mode to the Second Mode (First Switching)

example, the switching is switching from the first mode to the second mode and the result of the measurement includes a result of measurement of the small cell 20.

Accordingly, for example, the small base station 200-1 can flexibly be operated in accordance with conditions. More specifically, even if, for example, any one of the terminal devices 300-1 is present inside the small cell 20, the small base station 200-1 of the small cell 20 can be stopped or caused to operate in power saving mode if it is difficult to expect a sufficient effect (for example, offloading of traffic) by the small cell 20. As a result, power consumption of the small base station 200-1 can further be reduced. In addition, interference caused by the small base station 200-1 can be reduced.

Also, for example, controlling the switching includes determining a handover destination of the terminal device 300-1 connected to the small base station 200-1.

Accordingly, for example, after the small base station 200-1 is stopped or caused to operate in power saving mode, the terminal device 300-1 can continue to communicate.

Also, for example, the result of the measurement includes a result of measurement in each of a plurality of frequency bands and the switching is switching of the operation mode in units of frequency bands.

Accordingly, for example, the small base station 200-1 can be operated more flexibly. More specifically, if, for example, it is difficult to expect a sufficient effect (for example, offloading of traffic) from a portion of frequency bands of a plurality of frequency bands in the small cell 20, the small base station 200-1 can be stopped or caused to operate in power saving mode for the portion of frequency bands. As a result, power consumption of the small base station 200-1 can further be reduced. In addition, interference caused by the small base station 200-1 can be reduced.

Switching of the Operation Mode from the Second Mode to the First Mode (Second Switching)

The switching is, for example, from the second mode to the first mode.

Accordingly, for example, the small base station 200-1 can flexibly be operated in accordance with conditions. More specifically, if, for example, a terminal present in the small cell 20 is incapable of performing communication satisfactorily in other cells (for example, the macro cell), the small base station 200-1 restarts communication. Accordingly, the terminal may be made to be able to perform communication satisfactorily in the small cell 20. On the other hand, even if a terminal is present in the small cell 20, the small base station 200-1 can continue to stop or operate in power saving mode if the terminal can communicate satisfactorily in another cell (for example, the macro cell). As a result, power consumption of the small base station 200-1 can further be reduced. In addition, interference caused by the small base station 200-1 can be reduced.

Also, for example, the result of the measurement includes a result of measurement in each of a plurality of frequency bands and the switching is switching of the operation mode in units of frequency bands.

Accordingly, for example, the small base station 200-1 can be operated more flexibly. Specifically, for example, instead of restarting communication in all of a plurality of frequency bands of the small cell 20, the small base station 200-1 can restart communication in a portion of the plurality of frequency bands. As a result, power consumption of the small base station 200-1 can further be reduced. In addition, interference caused by the small base station 200-1 can be reduced.

Request of Reporting or Offering of a Result of Measurement

For example, reporting or offering of a result of measurement by the terminal device 300-1 is requested.

Accordingly, for example, even when handover is normally not necessary, a result of measurement by the terminal device 300 can be obtained in accordance with necessity on the network side.

(Second Embodiment)

Recognition of Switching and a Request of Reporting or Offering of a Result of Measurement According to the second embodiment of the present disclosure, switching of the operation mode of the small base station 200-2 from the first mode to the second mode in the small cell 20 is recognized in advance. Then, before the operation mode of the small base station 200-2 being switched from the first mode to the second mode, reporting or offering of a result of measurement by the terminal device 300-2 connected to the small base station 200-2 is requested. The first mode is a mode (for example, the normal mode) in which the small base station 200-2 can perform wireless communication with a device inside the small cell 20 and the second mode is a mode (for example, the stop mode or the power saving mode) that consumes less power than the first mode.

Accordingly, for example, a small base station can flexibly be operated in accordance with conditions. More specifically, for example, even when handover is normally not necessary, a result of measurement by the terminal device 300 can be obtained in accordance with necessity on the network side. Thus, for example, it becomes possible to determine an appropriate handover destination of the terminal device 300-2 connected to the small base station 200-2 attempted to stop or operate in power saving mode. Thus, even if any one of the terminal devices 300-2 is connected to the small base station 200-2, communication of the terminal device 300-2 can be continued. Therefore, regardless of whether or not the terminal device 300-2 is connected to the small base station 200-2, the small base station 200-2 can be stopped or operated in power saving mode.

Also, for example, the result of the measurement includes a result of measurement of one or more other cells than the small cell 20 of the small base station 200-2.

Accordingly, an appropriate handover destination (a base station or a cell) for handover between base stations can be found. Thus, for example, the whole small base station 200-2 can be stopped or caused to operate in power saving mode. As a result, power consumption can significantly be reduced.

Also, for example, the operation mode of the small base station 200-2 can be switched in units of frequency bands and the result of the measurement includes a result of measurement in one or more other frequency bands (for example, one or more other CC) than the frequency band (for example, CC) in which the operation mode is switched.

Accordingly, an appropriate handover destination (frequency band) for handover between base stations can be found. Thus, for example, while stopping the operation or operating in power saving mode in a portion of frequency bands, the small base station 200-2 can continue communication with the terminal band 300-2 in another frequency band. Therefore, power consumption can be reduced while offloading in progress.

Recognition of Switching and a Request of Reporting or Offering of a Result of Measurement According to the second embodiment of the present disclosure, before the operation mode of the small base station 200-2 in the small cell 20 being switched from the first mode to the second mode, a result of measurement by the terminal device 300-2 connected to the small base station 200-2 is acquired. Then, based on the result of the measurement, the handover destination of the terminal device 300-2 is determined. The first mode is a mode (for example, the normal mode) in which the small base station 200-2 can perform wireless communication with a device inside the small cell 20 and the second mode is a mode (for example, the stop mode or the power saving mode) that consumes less power than the first mode.

Accordingly, for example, the small base station 200-2 can flexibly be operated in accordance with conditions. More specifically, for example, even if any one of the terminal devices 300-2 is connected to the small base station 200-2, communication of the terminal device 300-2 can be continued. Therefore, regardless of whether or not the terminal device 300-2 is connected to the small base station 200-2, the small base station 200-2 can be stopped or operated in power saving mode.

Also, for example, the result of the measurement includes a result of measurement of one or more other cells than the small cell 20 of the small base station 200-2. The control unit 167 determines a base station other than the small base station 200-2 as the handover destination based on the result of the measurement.

Accordingly, for example, the whole small base station 200 can be stopped or caused to operate in power saving mode. As a result, power consumption can significantly be reduced.

Also, for example, the operation mode of the small base station 200-2 can be switched in units of frequency bands and the result of the measurement includes a result of measurement in one or more other frequency bands (for example, one or more other CC) than the frequency band (for example, CC) in which the operation mode is switched. Also, based on the result of the measurement, another frequency band than the frequency band (for example, CC) in which the operation mode is switched is determined as the handover destination.

Accordingly, for example, while stopping the operation or operating in power saving mode in a portion of frequency bands, the small base station 200-2 can continue communication with the terminal band 300-2 in another frequency band. Therefore, power consumption can be reduced while offloading in progress.

It should be understood by those skilled in the art that various modifications, combinations, sub-combinations and alterations may occur depending on design requirements and other factors insofar as they are within the scope of the appended claims or the equivalents thereof.

For example, technology according to the present disclosure can also be applied to a combination of operation modes other than the modes illustrated here. For example, when a terminal device operating as a mobile station can be caused to operate as a base station or an access point, the first mode may be a mode in which the terminal device operates as a base station or an access point and the second mode may be a mode in which the terminal device operates as a mobile station.

Also, for example, processing steps in a communication control process herein may not necessarily be executed chronologically along the order shown in a sequence diagram. For example, processing steps in a communication control process may be executed in a different order from the order shown in a sequence diagram or in parallel.

Also, a computer program causing hardware such as a CPU, a ROM, and a RAM contained in each device (a device of the macro base station, a device of the small base station, or a device of the control entity) to achieve a function equivalent to that of each configuration of each device can be created. Also, a storage medium caused to store the computer program may be provided. Also, an information processing device (for example, a processing circuit or a chip) including a memory (for example, a ROM and RAM) storing the computer program and one or more processors (for example, CPU, DSP or the like) capable of executing the computer program may be provided.

Note that the effects described here are not necessarily limitative. With or in the place of the above effects, there may be achieved the effects described in this specification and/or other effects that are clear to those skilled in the art based on the description of this specification. That is, the effects described in this specification are merely illustrative or exemplified effects, and are not limitative.

Additionally, the present technology may also be configured as below.

(1)
A communication control device including:
an acquisition unit configured to acquire a result of measurement by a terminal device; and
a control unit configured to control switching of an operation mode of a base station of
a small cell overlapping with a macro cell partially or wholly based on the result of the measurement,
wherein the switching is switching of the operation mode from one of a first mode and a second mode to the other,
wherein the first mode is a mode in which the base station can perform wireless communication with a device in the small cell, and
wherein the second mode is a mode that consumes less power than the first mode.

(2)
The communication control device according to (1),
wherein the switching is switching from the first mode to the second mode, and
wherein the result of the measurement includes a result of measurement in the small cell.

(3)
The communication control device according to (2),
wherein controlling the switching includes determining a handover destination of the terminal device connected to the base station.

(4)
The communication control device according to (1),
wherein the switching is switching from the second mode to the first mode.

(5)
The communication control device according to (4),
wherein the result of the measurement includes a result of measurement of one or more other cells than the small cell.

(6)
The communication control device according to any one of (1) to (5), wherein controlling the switching includes determining to perform the switching.

(7)
The communication control device according to (6),
wherein controlling the switching includes triggering the switching by the base station when it is determined to perform the switching.

(8)
The communication control device according to any one of (1) to (7),
wherein the result of the measurement includes a result of measurement in each of a plurality of frequency bands, and
wherein the switching is switching of the operation mode in units of frequency bands.

(9)
The communication control device according to any one of (1) to (8), wherein the second mode is a mode in which a signal processing circuit for at least the wireless communication stops continuously or discontinuously.

(10)
The communication control device according to any one of (1) to (9), further including:
a requesting unit configured to request reporting or offering of the result of the measurement by the terminal device.

(11)
A communication control method including:
acquiring a result of measurement by a terminal device; and
controlling switching of an operation mode of a base station of a small cell overlapping with a macro cell partially or wholly through a processor based on the result of the measurement,
wherein the switching is switching of the operation mode from one of a first mode and
a second mode to the other,
wherein the first mode is a mode in which the base station can perform wireless communication with a device in the small cell, and
wherein the second mode is a mode that consumes less power than the first mode.

(12)
A communication control device including:
a recognition unit configured to recognize that an operation mode of a base station of a small cell overlapping with a macro cell partially or wholly is switched from a first mode to a second mode in advance; and
a requesting unit configured to request reporting or offering of a result of measurement by a terminal device connected to the base station before the operation mode of the base station being switched from the first mode to the second mode,
wherein the first mode is a mode in which the base station can perform wireless communication with a device in the small cell, and
wherein the second mode is a mode that consumes less power than the first mode.

(13)
The communication control device according to (12),
wherein the result of the measurement includes a result of measurement of one or more other cells than the small cell.

(14)
The communication control device according to (12) or (13),
wherein the operation mode can be switched in units of frequency bands, and
wherein the result of the measurement includes a result of measurement of one or more other frequency bands than the frequency band in which the operation mode is switched.

(15)
The communication control device according to any one of (12) to (14), wherein the second mode is a mode in which a signal processing circuit for at least the wireless communication stops.

(16)
A communication control method including:
recognizing that an operation mode of a base station of a small cell overlapping with a macro cell partially or wholly is switched from a first mode to a second mode in advance; and
requesting reporting or offering of a result of measurement by a terminal device connected to the base station through a processor before the operation mode of the base station being switched from the first mode to the second mode, wherein the first mode is a mode in which the base station can perform wireless communication with a device in the small cell, and wherein the second mode is a mode that consumes less power than the first mode.

(17)

A communication control device including:

an acquisition unit configured to acquire a result of measurement by a terminal device connected to a base station before an operation mode of the base station of a small cell overlapping with a macro cell partially or wholly being switched from a first mode to a second mode; and a control unit configured to determine a handover destination of the terminal device based on the result of the measurement, wherein the first mode is a mode in which the base station can perform wireless communication with a device in the small cell, and wherein the second mode is a mode that consumes less power than the first mode.

(18)

The communication control device according to (17), wherein the result of the measurement includes a result of measurement of one or more other cells than the small cell, and wherein the control unit determines another base station than the base station as the handover destination based on the result of the measurement.

(19)

The communication control device according to (17), wherein the operation mode can be switched in units of frequency bands, wherein the result of the measurement includes a result of measurement in one or more other frequency bands than the frequency band in which the operation mode is switched, and wherein the control unit determines the other frequency band than the frequency band as the handover destination based on the result of the measurement.

(20)

A communication control method including:

acquiring a result of measurement by a terminal device connected to a base station before an operation mode of the base station of a small cell overlapping with a macro cell partially or wholly being switched from a first mode to a second mode; and determining a handover destination of the terminal device through a processor based on the result of the measurement, wherein the first mode is a mode in which the base station can perform wireless communication with a device in the small cell, and wherein the second mode is a mode that consumes less power than the first mode.

(21)

The system comprising:

circuitry configured to acquire a result of a measurement by a terminal device; and control switching an operation mode of a base station of a small cell partially or wholly overlapping a macro cell between a first mode and a second mode based on the result of the measurement, the second mode being a mode that consumes less power than the first mode.

(22)

The system of (21), wherein the result of the measurement includes a result of a measurement in the small cell.

(23)

The system of (21) or (22), wherein the circuitry is configured to determine a handover destination of the terminal device connected to the base station upon determining to switch the operation mode of the base station from the first mode to the second mode.

(24)

The system of any one of (21) to (23), wherein the circuitry is configured to switch the operation mode of the base station from the second mode to the first mode.

(25)

The system of any one of (21) to (24), wherein the result of the measurement includes a result of a measurement of one or more cells other than the small cell.

(26)

The system of any one of (21) to (25), wherein the circuitry is configured to determine to perform the switching.

(27)

The system of (26), wherein the circuitry is configured to control the switching by triggering the switching by the base station when it is determined to perform the switching.

(28)

The system of any one of (21) to (27), wherein the result of the measurement includes a result of a measurement in each of a plurality of frequency bands, and the circuitry is configured to control switching the operation mode by switching of the operation mode in units of frequency bands.

(29)

The system of any one of (21) to (28), wherein the second mode is a mode in which a signal processing circuit for at least the wireless communication in the base station stops continuously or discontinuously.

(30)

The system of any one of (21) to (29), wherein the circuitry is configured to request the terminal device to report the results of the measurement.

(31)

A communication control method comprising:

acquiring a result of a measurement by a terminal device; and controlling switching an operation mode of a base station of a small cell partially or wholly overlapping a macro cell between a first mode and a second mode based on the result of the measurement, the second mode being a mode that consumes less power than the first mode.

(32)

A system comprising:

circuitry configured to identify that an operation mode of a base station of a small cell partially or wholly overlapping with a macro cell will be switched from a first mode to a second mode, the second mode being a mode that consumes less power than the first mode; and request a terminal device connected to the base station to report a result of a measurement before the operation mode of the base station is switched from the first mode to the second mode.

(33)

The system of (32), wherein
the result of the measurement includes a result of a measurement of one or cells other than the small cell.

(34)

The system of (32) or (33), wherein
the operation mode is configured to be switched in units of frequency bands, and
the result of the measurement includes a result of a measurement of one or more frequency bands other than the frequency band in which the operation mode is switched.

(35)

The system of any one of (32) to (34), wherein
the second mode is a mode in which a signal processing circuit for at least the wireless communication in the base station stops continuously or discontinuously.

(36)

A communication control method comprising:
identifying that an operation mode of a base station of a small cell partially or wholly overlapping with a macro cell will be switched from a first mode to a second mode, the second mode being a mode that consumes less power than the first mode; and
requesting a terminal device connected to the base station to report a result of a measurement before the operation mode of the base station is switched from the first mode to the second mode.

(37)

A system comprising:
circuitry configured to
acquire a result of a measurement by a terminal device connected to a base station of a small cell partially or wholly overlapping with a macro cell before an operation mode of the base station is switched from a first mode to a second mode, the second mode being a mode that consumes less power than the first mode; and
determine a handover destination of the terminal device based on the result of the measurement.

(38)

The system of (37), wherein
the result of the measurement includes a result of a measurement of one or more cells other than the small cell, and
the circuitry is configured to determine a base station other than the base station as the handover destination based on the result of the measurement.

(39)

The system of (37) or (38), wherein
the operation mode is configured to be switched in units of frequency bands,
the result of the measurement includes a result of a measurement in one or more frequency bands other than the frequency band in which the operation mode is switched, and
the circuitry is configured to determine a frequency band other than the frequency band in which the operation mode is switched as the handover destination based on the result of the measurement.

(40)

A communication control method comprising:
acquiring a result of a measurement by a terminal device connected to a base station of a small cell partially or wholly overlapping with a macro cell before an operation mode of the base station is switched from a first mode to a second mode, the second mode being a mode that consumes less power than the first mode; and
determining a handover destination of the terminal device based on the result of the measurement.

REFERENCE SIGNS LIST

1 Communication system
10 Macro cell
20 Small cell
100 Macro base station
151 Requesting unit
153 Information acquisition unit
155 Control unit
161 Switching recognition unit
163 Requesting unit
165 Information acquisition unit
167 Control unit
200 Small base station
300 Terminal device
400 Control entity

The invention claimed is:

1. A system comprising:
circuitry configured to
acquire a result of a measurement by a terminal device; and
control switching an operation mode of a base station of a small cell partially or wholly overlapping a macro cell between a first mode and a second mode based on the result of the measurement, the second mode being a mode that consumes less power than the first mode, wherein
the circuitry is further configured to
calculate, for each small cell, an average of the results of the measurements by all the terminal devices connected to the base station; and
switch the operation mode of the base station of the small cell, the average of which is determined to be less than a predetermined threshold, from the first mode to the second mode.

2. The system of claim 1, wherein
the result of the measurement includes a result of a measurement in the small cell.

3. The system of claim 1, wherein
the circuitry is configured to determine a handover destination of the terminal device connected to the base station upon determining to switch the operation mode of the base station from the first mode to the second mode.

4. The system of claim 1, wherein
the circuitry is configured to switch the operation mode of the base station from the second mode to the first mode.

5. The system of claim 1, wherein
the result of the measurement includes a result of a measurement of one or more cells other than the small cell.

6. The system of claim 1, wherein
the circuitry is configured to determine to perform the switching.

7. The system of claim 6, wherein
the circuitry is configured to control the switching by triggering the switching by the base station when it is determined to perform the switching.

8. The system of claim 1, wherein
the result of the measurement includes a result of a measurement in each of a plurality of frequency bands, and the circuitry is configured to control switching the operation mode by switching of the operation mode in units of frequency bands.

9. The system of claim 1, wherein the second mode is a mode in which a signal processing circuit for at least the wireless communication in the base station stops continuously or discontinuously.

10. The system of claim 1, wherein the circuitry is configured to request the terminal device to report the results of the measurement.

11. A communication control method comprising:
acquiring a result of a measurement by a terminal device; and
controlling, using circuitry, switching an operation mode of a base station of a small cell partially or wholly overlapping a macro cell between a first mode and a second mode based on the result of the measurement, the second mode being a mode that consumes less power than the first mode, wherein
the method further comprises
calculating, for each small cell, an average of the results of the measurements by all the terminal devices connected to the base station; and
switching the operation mode of the base station of the small cell, the average of which is determined to be less than a predetermined threshold, from the first mode to the second mode.

12. A system comprising:
circuitry configured to
identify that an operation mode of a base station of a small cell partially or wholly overlapping with a macro cell will be switched from a first mode to a second mode, the second mode being a mode that consumes less power than the first mode; and
request a terminal device connected to the base station to report a result of a measurement before the operation mode of the base station is switched from the first mode to the second mode, wherein
the circuitry is further configured to
calculate, for each small cell, an average of the results of the measurements by all the terminal devices connected to the base station; and
switch the operation mode of the base station of the small cell, the average of which is determined to be less than a predetermined threshold, from the first mode to the second mode.

13. The system of claim 12, wherein the result of the measurement includes a result of a measurement of one or cells other than the small cell.

14. The system of claim 12, wherein
the operation mode is configured to be switched in units of frequency bands, and
the result of the measurement includes a result of a measurement of one or more frequency bands other than the frequency band in which the operation mode is switched.

15. The system of claim 12, wherein the second mode is a mode in which a signal processing circuit for at least the wireless communication in the base station stops continuously or discontinuously.

16. A communication control method comprising:
identifying, using circuitry, that an operation mode of a base station of a small cell partially or wholly overlapping with a macro cell will be switched from a first mode to a second mode, the second mode being a mode that consumes less power than the first mode; and
requesting a terminal device connected to the base station to report a result of a measurement before the operation mode of the base station is switched from the first mode to the second mode, wherein
the method further comprises
calculating, for each small cell, an average of the results of the measurements by all the terminal devices connected to the base station; and
switching the operation mode of the base station of the small cell, the average of which is determined to be less than a predetermined threshold, from the first mode to the second mode.

17. A system comprising:
circuitry configured to
acquire a result of a measurement by a terminal device connected to a base station of a small cell partially or wholly overlapping with a macro cell before an operation mode of the base station is switched from a first mode to a second mode, the second mode being a mode that consumes less power than the first mode; and
determine a handover destination of the terminal device based on the result of the measurement, wherein
the circuitry is further configured to
calculate, for each small cell, an average of the results of the measurements by all the terminal devices connected to the base station; and
switch the operation mode of the base station of the small cell, the average of which is determined to be less than a predetermined threshold, from the first mode to the second mode.

18. The system of claim 17, wherein
the result of the measurement includes a result of a measurement of one or more cells other than the small cell, and
the circuitry is configured to determine a base station other than the base station as the handover destination based on the result of the measurement.

19. The system of claim 17, wherein
the operation mode is configured to be switched in units of frequency bands,
the result of the measurement includes a result of a measurement in one or more frequency bands other than the frequency band in which the operation mode is switched, and
the circuitry is configured to determine a frequency band other than the frequency band in which the operation mode is switched as the handover destination based on the result of the measurement.

20. A communication control method comprising:
acquiring a result of a measurement by a terminal device connected to a base station of a small cell partially or wholly overlapping with a macro cell before an operation mode of the base station is switched from a first mode to a second mode, the second mode being a mode that consumes less power than the first mode; and
determining, using circuitry, a handover destination of the terminal device based on the result of the measurement, wherein
the method further comprises
calculating, for each small cell, an average of the results of the measurements by all the terminal devices connected to the base station; and
switching the operation mode of the base station of the small cell, the average of which is determined to be less than a predetermined threshold, from the first mode to the second mode.

21. The system of claim 1, wherein the predetermined threshold dynamically changes on a time axis.

22. A system comprising:
circuitry configured to
   acquire a result of a measurement by a terminal device; and
   control switching an operation mode of a base station of a small cell partially or wholly overlapping a macro cell between a first mode and a second mode based on the result of the measurement, the second mode being a mode that consumes less power than the first mode, wherein
the circuitry is further configured to
   count, for each small cell, a number of the terminal device whose result of the measurement is equal to or more than a predetermined threshold; and
   switch the operation mode of the base station of the small cell, the number of which is determined to be equal to or less than a predetermined number, from the first mode to the second mode.

23. The system of claim 22, wherein the predetermined number dynamically changes on a time axis.

24. The system of claim 22, wherein a different number is set to each small cell as the predetermined number.

* * * * *